US012592905B2

(12) United States Patent
Xu et al.

(10) Patent No.: US 12,592,905 B2
(45) Date of Patent: Mar. 31, 2026

(54) METHOD FOR DETERMINING NAT TRAVERSAL POLICY AND DEVICE

(71) Applicant: HUAWEI TECHNOLOGIES CO., LTD., Guangdong (CN)

(72) Inventors: Qiannan Xu, Chengdu (CN); Sosnin Vladimir, Saint Petersburg (RU); Valeev Timur, Saint Petersburg (RU); Mikhail Khokhlov, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 71 days.

(21) Appl. No.: 18/698,023

(22) PCT Filed: Aug. 9, 2022

(86) PCT No.: PCT/CN2022/111207
§ 371 (c)(1),
(2) Date: Apr. 3, 2024

(87) PCT Pub. No.: WO2023/071382
PCT Pub. Date: May 4, 2023

(65) Prior Publication Data
US 2024/0396866 A1 Nov. 28, 2024

(30) Foreign Application Priority Data
Oct. 26, 2021 (RU) ........................... RU2021131140

(51) Int. Cl.
*H04L 61/256* (2022.01)
(52) U.S. Cl.
CPC .................................. *H04L 61/256* (2013.01)
(58) Field of Classification Search
None
See application file for complete search history.

(56) References Cited

U.S. PATENT DOCUMENTS 9,497,160 B1 * 11/2016 Diffie .................. H04L 61/2521
2004/0139228 A1 7/2004 Takeda et al.
(Continued)

FOREIGN PATENT DOCUMENTS

CN 110113439 A 8/2019
CN 113301183 A * 8/2021 ........... H04L 61/256
WO WO-2018177409 A1 * 10/2018 ............. H04L 45/66

OTHER PUBLICATIONS

Midcom WG et al,"Symmetric NAT Traversal using STUN", Internet Engineering Task ForceInternet Draft draft-takeda-symmetric-nat-traversal-00.txt,Jun. 1, 2003,total 24 pages,XP015005445.
(Continued)

*Primary Examiner* — Phyllis A Book

(57) ABSTRACT

This application provides a method for determining a network address translation (NAT) traversal policy and an apparatus. The method is applied to a communication system including a first terminal device and a second terminal device. The first terminal device accesses a network by using a first NAT device, and the second terminal device accesses the network by using a second NAT device. In the method, it is determined, by separately obtaining a NAT type and an internet protocol (IP) address of the first terminal device and a NAT type and an IP address of the second terminal device, that both the first terminal device and the second terminal device are of a symmetric NAT type. In addition, based on whether the IP address of the first terminal device is the same as the IP address of the second terminal device, NAT traversal is performed according to different traversal policies.

9 Claims, 8 Drawing Sheets

Private network    NAT traversal    Public network

Address mapping table

| No. | Internal network address | Public network address | Destination address |
|---|---|---|---|
| Terminal device 1 | 192.168.0.100:10000 | 210.21.12.140:2000 | 210.15.27.166:8000 |
| Terminal device 2 | 192.168.0.200:10000 | 210.21.12.140:3000 | 210.15.27.140:8000 |

(56)     References Cited

U.S. PATENT DOCUMENTS

| | | | |
|---|---|---|---|
| 2006/0215684 A1* | 9/2006 | Capone ................ | H04L 63/029 |
| | | | 709/227 |
| 2007/0076729 A1 | 4/2007 | Takeda | |
| 2011/0219123 A1* | 9/2011 | Yang ....................... | H04L 67/14 |
| | | | 709/227 |
| 2011/0299554 A1* | 12/2011 | Ros-Giralt ............. | H04L 45/22 |
| | | | 370/469 |
| 2012/0047271 A1* | 2/2012 | Huang ................. | H04L 61/256 |
| | | | 709/227 |
| 2015/0043430 A1* | 2/2015 | Garcia Martin .... | H04L 61/4557 |
| | | | 370/328 |

OTHER PUBLICATIONS

Yong Wang et al."Research on Symmetric NAT Traversal in P2P applications",Computing in the Global Information Technology,ICCGI ''06,Aug. 1, 2006,total 6 pages,XP031056511.

Yuan Wei et al,"A New Method for Symmetric NAT Traversal in UOP and TCP",Aug. 4, 2008, total 8 pages, XP055371945.

J. Rosenberg et al: "STUN—Simple Traversal of User Datagram Protocol (UDP) Through Network Address Translators (NATs)", Request for Comments: 3489, Mar. 2003, total 47 pages.

* cited by examiner

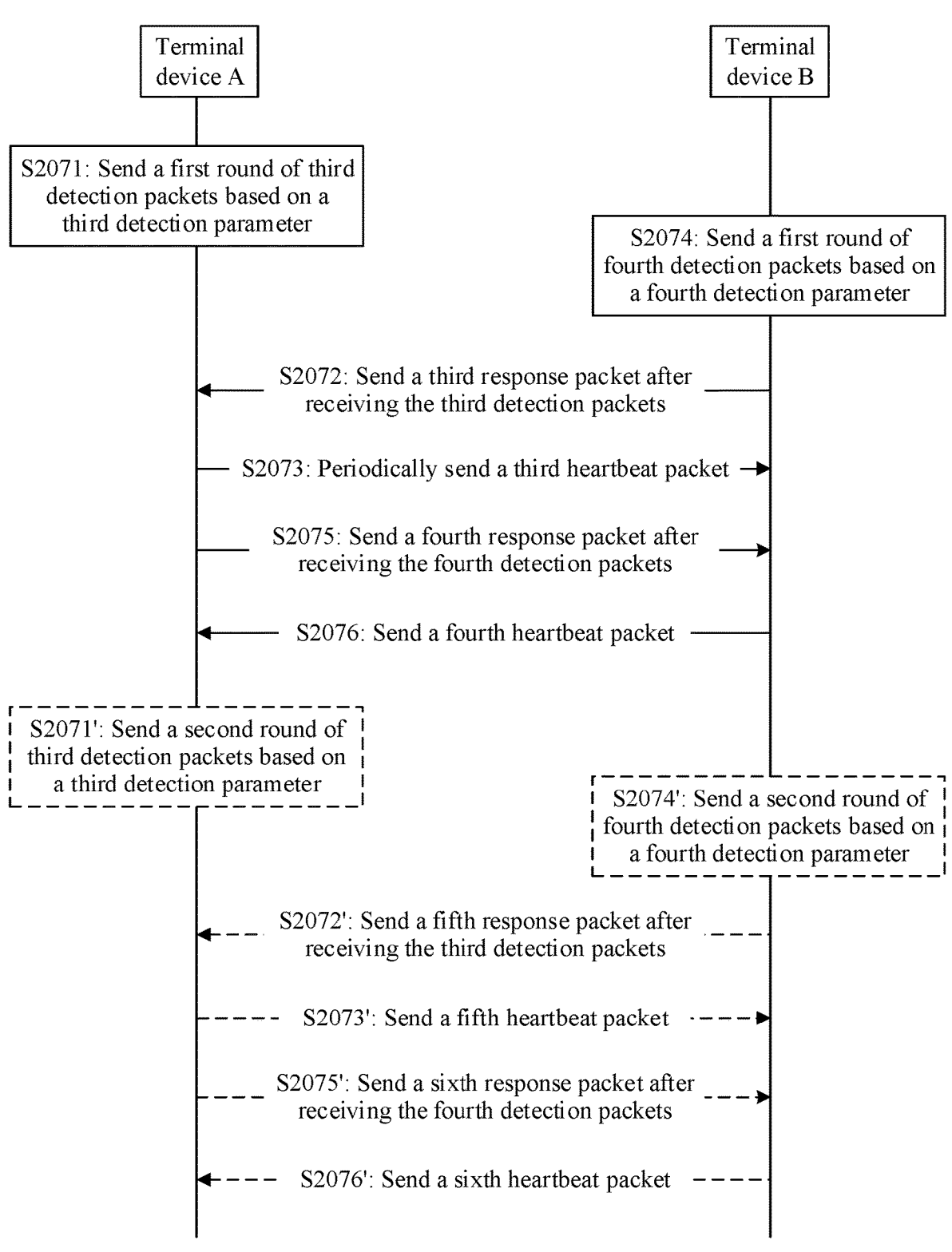

Terminal device A

Terminal device B

S2071: Send a first round of third detection packets based on a third detection parameter S2074: Send a first round of fourth detection packets based on a fourth detection parameter S2072: Send a third response packet after receiving the third detection packets S2073: Periodically send a third heartbeat packet S2075: Send a fourth response packet after receiving the fourth detection packets S2076: Send a fourth heartbeat packet S2071': Send a second round of third detection packets based on a third detection parameter S2074': Send a second round of fourth detection packets based on a fourth detection parameter S2072': Send a fifth response packet after receiving the third detection packets S2073': Send a fifth heartbeat packet S2075': Send a sixth response packet after receiving the fourth detection packets S2076': Send a sixth heartbeat packet

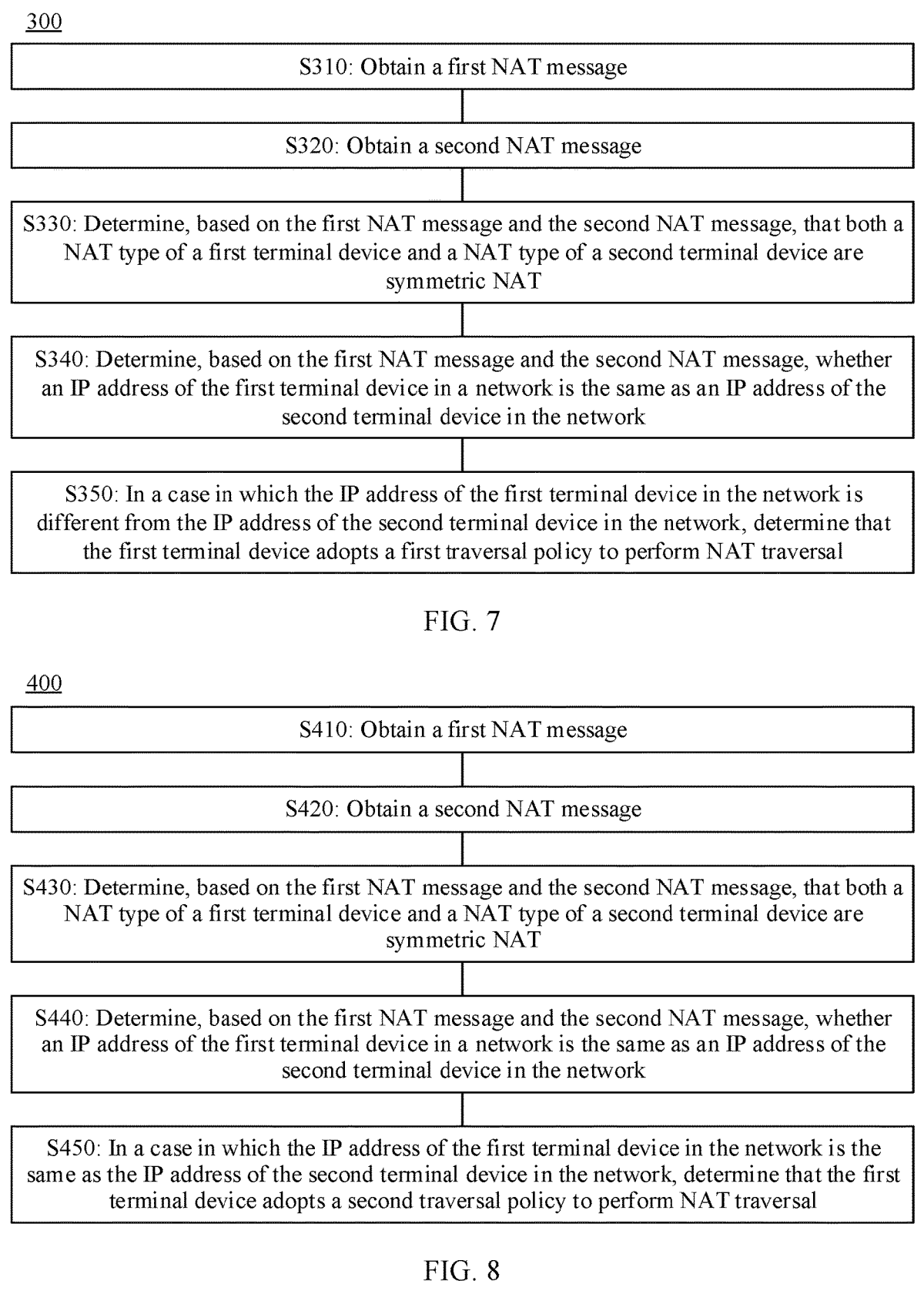

| S310: Obtain a first NAT message |

| S320: Obtain a second NAT message |

| S330: Determine, based on the first NAT message and the second NAT message, that both a NAT type of a first terminal device and a NAT type of a second terminal device are symmetric NAT |

| S340: Determine, based on the first NAT message and the second NAT message, whether an IP address of the first terminal device in a network is the same as an IP address of the second terminal device in the network |

| S350: In a case in which the IP address of the first terminal device in the network is different from the IP address of the second terminal device in the network, determine that the first terminal device adopts a first traversal policy to perform NAT traversal |

| S410: Obtain a first NAT message |

| S420: Obtain a second NAT message |

| S430: Determine, based on the first NAT message and the second NAT message, that both a NAT type of a first terminal device and a NAT type of a second terminal device are symmetric NAT |

| S440: Determine, based on the first NAT message and the second NAT message, whether an IP address of the first terminal device in a network is the same as an IP address of the second terminal device in the network |

| S450: In a case in which the IP address of the first terminal device in the network is the same as the IP address of the second terminal device in the network, determine that the first terminal device adopts a second traversal policy to perform NAT traversal |

FIG. 8

METHOD FOR DETERMINING NAT TRAVERSAL POLICY AND DEVICE

CROSS-REFERENCE TO RELATED APPLICATIONS

This application is a National Stage of International Application No. PCT/CN2022/111207, filed on Aug. 9, 2022, which claims priority to Russian Patent Application No. 2021131140, filed on Oct. 26, 2021. Both of the aforementioned applications are hereby incorporated by reference in their entireties.

TECHNICAL FIELD

This application relates to network address translation technologies in the communication field, and in particular, to a method for determining a NAT traversal policy and a device.

BACKGROUND

Network address translation (network address translation, NAT) traversal is a very important technology in the field of peer-to-peer (peer-to-peer, P2P) network real-time audio and videos. The NAT traversal technology enables clients to directly communicate with each other. This helps reduce a peer-to-peer delay, and reduce pressure and costs of a server. A success rate of the NAT traversal technology in the conventional technology is low. Therefore, how to improve the NAT traversal success rate is an urgent problem to be resolved.

SUMMARY

This application provides a method for determining a NAT traversal policy and a device. This method can improve a NAT traversal success rate.

According to a first aspect, a method for determining a network address translation NAT traversal policy is provided. The method is applied to a communication system including a first terminal device and a second terminal device. The first terminal device accesses a network by using a first NAT device, and the second terminal device accesses the network by using a second NAT device. The method includes: obtaining a first NAT message, where the first NAT message indicates a NAT type of the first terminal device and an Internet protocol IP address of the first terminal device in the network, and the NAT type includes symmetric NAT and cone NAT; obtaining a second NAT message, where the second NAT message indicates a NAT type of the second terminal device and an IP address of the second terminal device in the network; determining, based on the first NAT message and the second NAT message, that both the NAT type of the first terminal device and the NAT type of the second terminal device are symmetric NAT; determining, based on the first NAT message and the second NAT message, whether the IP address of the first terminal device in the network is the same as the IP address of the second terminal device in the network; and in a case in which the IP address of the first terminal device in the network is different from the IP address of the second terminal device in the network, determining that the first terminal device adopts a first traversal policy to perform NAT traversal.

In an embodiment of this application, it is determined, by separately obtaining the NAT type and the IP address of the first terminal device and the NAT type and the IP address of the second terminal device, that both the first terminal device and the second terminal device are of a symmetric NAT type, and it is determined whether the IP address of the first terminal device is the same as the IP address of the second terminal device. When the IP address of the first terminal device is different from the IP address of the second terminal device, NAT traversal is performed according to the first traversal policy. In this way, a NAT traversal success rate is improved.

With reference to the first aspect, in some implementations of the first aspect, the method further includes: obtaining a first identity ID message and a second ID message, where the first ID message indicates an ID of the first terminal device, and the second ID message indicates an ID of the second terminal device. The determining that the first terminal device adopts a first traversal policy to perform NAT traversal includes: determining a parameter of the first traversal policy based on the first ID message and the second ID message.

It should be noted that, the determining a parameter of the first traversal policy may be understood as determining values of parameters included in the first traversal policy. For example, the parameter included in the first traversal policy may include items described below: a sending sequence of detection packets in each round, a quantity of sending rounds of detection packets, a sending quantity of the detection packets in each round, a destination port step of the detection packets in each round, initial values of destination ports of the detection packets in each round, and a value of a destination IP address of the detection packets in each round.

For example, it may be preset that: in a case in which a value of the ID of the first terminal device is greater than a value of the ID of the second terminal device, it is determined that the values of the parameters included in the first traversal policy form a first parameter set; or in a case in which a value of the ID of the first terminal device is less than a value of the ID of the second terminal device, it is determined that the values of the parameters included in the first traversal policy form a second parameter set.

It should be understood that, if in the values of the parameters included in the first traversal policy, at least one parameter has different values, it is considered that parameter sets formed by the values of the parameters included in the first traversal policy are different. The values of the parameters included in the traversal policy of the first terminal device are determined based on the ID of the first terminal device and the ID of the second terminal device, to prevent the NAT traversal success rate from being decreased because the first terminal device and the second terminal device use a same parameter set.

With reference to the first aspect, in some implementations of the first aspect, the first NAT message further indicates a port of the first terminal device in the network, and the second NAT message further indicates a port of the second terminal device in the network. The first traversal policy includes the sending sequence of the detection packets in each round, the quantity of the sending rounds of the detection packets, the sending quantity of the detection packets in each round, the destination port step of the detection packets in each round, the initial values of the destination ports of the detection packets in each round, and the destination IP address of the detection packets in each round. The destination port step of the detection packets in each round is a change value of a destination port of an $(i+1)^{th}$ detection packet in each round relative to a destination port of an $i^{th}$ detection packet in each round, where i is a positive integer. The initial values of the destination ports of the detection packets in each round are the port that is of the second terminal device in the network and that is indicated by the second NAT message. The destination IP address of the detection packets in each round is the IP address that is of the second terminal device in the network and that is indicated by the second NAT message.

In some embodiments, the destination port step of the detection packets in each round and the initial values of the destination ports of the detection packets in each round described above may alternatively be replaced with the destination port of the $i^{th}$ detection packet. For example, the destination port of the $i^{th}$ detection packet is a sum of a product of i and the destination port step of the detection packets in each round and the initial values of the destination ports of the detection packets in each round.

With reference to the first aspect, in some implementations of the first aspect, a total sending quantity of the detection packets is less than or equal to a maximum sending quantity of packets allowed by a firewall flow control mechanism corresponding to the first terminal device.

The total sending quantity of the detection packets is set to be less than or equal to the maximum sending quantity of the packets allowed by the firewall flow control mechanism corresponding to the first terminal device, so that a NAT traversal failure caused by triggering the firewall flow control mechanism of the first terminal device in a subsequent NAT traversal process can be avoided.

With reference to the first aspect, in some implementations of the first aspect, the quantity of the sending rounds of the detection packets is 1.

In a case in which the IP address of the first terminal device in the network is different from the IP address of the second terminal device in the network, that is, the first terminal device and the second terminal device access the network by using different NAT devices, a destination port used by the first terminal device to send the detection packet is different from a destination port used by the second terminal device to send the detection packet. Therefore, when both the first terminal device and the second terminal device send the detection packet, mutual impact is small. Thus, the first terminal device may send only one round of detection packets. In this way, the NAT traversal success rate can be ensured, and power consumption of the first terminal device can be reduced.

With reference to the first aspect, in some implementations of the first aspect, the sending quantity of the detection packets in each round is 128; and/or the destination port step of the detection packets in each round is 1 or 2.

According to a second aspect, a method for determining a network address translation NAT traversal policy is provided. The method is applied to a communication system including a first terminal device and a second terminal device. The first terminal device accesses a network by using a first NAT device, and the second terminal device accesses the network by using a second NAT device. The method includes: obtaining a first NAT message, where the first NAT message indicates a NAT type of the first terminal device and an Internet protocol IP address of the first terminal device in the network, and the NAT type includes symmetric NAT and cone NAT; obtaining a second NAT message, where the second NAT message indicates a NAT type of the second terminal device and an IP address of the second terminal device in the network; determining, based on the first NAT message and the second NAT message, that both the NAT type of the first terminal device and the NAT type of the second terminal device are symmetric NAT; determining, based on the first NAT message and the second NAT message, whether the IP address of the first terminal device in the network is the same as the IP address of the second terminal device in the network; and in a case in which the IP address of the first terminal device in the network is the same as the IP address of the second terminal device in the network, determining that the first terminal device adopts a second traversal policy to perform NAT traversal.

In an embodiment of this application, it is determined, by separately obtaining the NAT type and the IP address of the first terminal device and the NAT type and the IP address of the second terminal device, that both the first terminal device and the second terminal device are of a symmetric NAT type, and it is determined whether the IP address of the first terminal device is the same as the IP address of the second terminal device. When the IP address of the first terminal device is the same as the IP address of the second terminal device, NAT traversal is performed according to the second traversal policy. In this way, a NAT traversal success rate is improved.

With reference to the second aspect, in some implementations of the second aspect, the method includes: obtaining a first identity ID message and a second ID message, where the first ID message indicates an ID of the first terminal device, and the second ID message indicates an ID of the second terminal device. The determining that the first terminal device adopts a second traversal policy to perform NAT traversal includes: determining a parameter of the second traversal policy based on the first ID message and the second ID message.

It should be noted that, the determining a parameter of the second traversal policy may be understood as determining values of parameters included in the second traversal policy. For example, the parameter included in the second traversal policy may include items described below: a quantity of sending rounds of detection packets, a sending sequence of detection packets in each round, a sending quantity of the detection packets in each round, a destination port step of the detection packets in each round, initial values of destination ports of the detection packets in each round, and a value of a destination IP address of the detection packets in each round.

For example, it may be preset that: in a case in which a value of the ID of the first terminal device is greater than a value of the ID of the second terminal device, it is determined that the values of the parameters included in the second traversal policy form a third parameter set; or in a case in which a value of the ID of the first terminal device is less than a value of the ID of the second terminal device, it is determined that the values of the parameters included in the second traversal policy form a fourth parameter set.

It should be understood that, if in the values of the parameters included in the second traversal policy, at least one parameter has different values, it is considered that parameter sets formed by the values of the parameters included in the second traversal policy are different.

The values of the parameters included in the traversal policy of the first terminal device are determined based on the ID of the first terminal device and the ID of the second terminal device, to prevent the NAT traversal success rate from being decreased because the first terminal device and the second terminal device use a same parameter set.

With reference to the second aspect, in some implementations of the second aspect, the first NAT message further indicates a port of the first terminal device in the network, and the second NAT message further indicates a port of the second terminal device in the network. The second traversal policy includes the quantity of the sending rounds of the detection packets, the sending sequence of the detection packets in each round, the sending quantity of the detection packets in each round, the destination port step of the detection packets in each round, the initial values of the destination ports of the detection packets in each round, and the destination IP address of the detection packets in each round. The sending sequence of the detection packets in each round is sending first or sending later. The destination port step of the detection packets in each round is a change value of a destination port of an $(i+1)^{th}$ detection packet in each round relative to a destination port of an $i^{th}$ detection packet in each round, where i is a positive integer. The initial values of the destination ports of the detection packets in each round are the port that is of the second terminal device in the network and that is indicated by the second NAT message. The destination IP address of the detection packets in each round is the IP address that is of the second terminal device in the network and that is indicated by the second NAT message.

In some embodiments, the destination port step of the detection packets in each round and the initial values of the destination ports of the detection packets in each round described above may alternatively be replaced with the destination port of the $i^{th}$ detection packet. For example, the destination port of the $i^{th}$ detection packet is a sum of a product of i and the destination port step of the detection packets in each round and the initial values of the destination ports of the detection packets in each round.

With reference to the second aspect, in some implementations of the second aspect, a sending quantity of the detection packets is less than or equal to a maximum sending quantity of packets allowed by a firewall flow control mechanism corresponding to the first terminal device.

The total sending quantity of the detection packets is set to be less than or equal to the maximum sending quantity of the packets allowed by the firewall flow control mechanism corresponding to the first terminal device, so that a NAT traversal failure caused by triggering the firewall flow control mechanism of the first terminal device in a subsequent NAT traversal process can be avoided.

With reference to the second aspect, in some implementations of the second aspect, the quantity of the sending rounds of the detection packets is 2.

In a case in which the IP address of the first terminal device in the network is the same as the IP address of the second terminal device in the network, that is, the first terminal device and the second terminal device access the network by using a same NAT device, it may be considered that the first NAT device and the second NAT device are a same device. In this way, a destination port used by the first terminal device to send the detection packet may be the same as a destination port used by the second terminal device to send the detection packet. Therefore, when both the first terminal device and the second terminal device send the detection packet, mutual impact exists. Therefore, to improve a NAT traversal success rate of the first terminal device, the first terminal device may send at least two rounds of detection packets.

With reference to the second aspect, in some implementations of the second aspect, the sending quantity of the detection packets in each round is 64; and/or a destination port step of detection packets in one round is 3, and a destination port step of detection packets in another round is 2, or the destination port step of the detection packets in each round is 1.

According to a third aspect, a network address translation NAT traversal method is provided. The method includes: sending detection packets according to a first traversal policy, where the first traversal policy includes a sending quantity of the detection packets and a destination port step of the detection packets, the sending quantity of the detection packets is 128, the destination port step of the detection packets is 1 or 2, and the destination port step of the detection packets is a change value of a destination port of an $(i+1)^{th}$ detection packet relative to a destination port of an $i^{th}$ detection packet, where i is a positive integer.

In an embodiment of this application, the destination port step is set to 1 or 2, and 128 detection packets are sent to perform NAT traversal, so that a NAT traversal success rate can be improved.

According to a fourth aspect, a network address translation NAT traversal method is provided. The method includes: sending a first round of detection packets according to a second traversal policy. The second traversal policy includes a quantity of sending rounds of detection packets, a sending quantity of detection packets in each round, and a destination port step of the detection packets in each round. The quantity of the sending rounds of the detection packets is 2; the sending quantity of the detection packets in each round is 64; and a destination port step of detection packets in one round is 3, and a destination port step of detection packets in another round is 2, or the destination port step of the detection packets in each round is 1.

In an embodiment of this application, two rounds of detection packets are sent, a destination port step is set to 1 in one round, and a destination port step is set to 2 in the other round, or a destination port step is set to 1 in both rounds, and 64 detection packets are sent in each round to perform NAT traversal, so that the NAT traversal success rate can be improved.

With reference to the fourth aspect, in some implementations of the fourth aspect, the second traversal policy further includes a sending sequence of the detection packets in each round. In a case in which the sending sequence of the detection packets in each round is sending first, the method further includes: if no response packet is received within a target time period, sending a second round of detection packets according to the second traversal policy, where the response packet indicates that the detection packets are received.

With reference to the fourth aspect, in some implementations of the fourth aspect, the second traversal policy further includes a sending sequence of the detection packets in each round. In a case in which the sending sequence of the detection packets in each round is sending later, before the sending a first round of detection packets according to a second traversal policy, the method further includes: receiving first indication information, where the first indication information indicates to send the first round of the detection packets.

With reference to the fourth aspect, in some implementations of the fourth aspect, the second traversal policy further includes the sending sequence of the detection packets in each round, and in a case in which the sending sequence of the detection packets in each round is sending later, the method further includes: receiving second indication information, where the second indication information indicates to send a second round of detection packets; and sending the second round of the detection packets according to the second traversal policy.

According to a fifth aspect, an apparatus for determining a network address translation NAT traversal policy is provided. The apparatus includes: an obtaining unit, configured to obtain a first NAT message, where the first NAT message indicates a NAT type of a first terminal device and an Internet protocol IP address of the first terminal device in a network, the NAT type includes symmetric NAT and cone NAT, and the obtaining unit is further configured to obtain a second NAT message, where the second NAT message indicates a NAT type of a second terminal device and an IP address of the second terminal device in the network; a processing unit, configured to determine, based on the first NAT message and the second NAT message, that both the NAT type of the first terminal device and the NAT type of the second terminal device are symmetric NAT, where the processing unit is further configured to determine, based on the first NAT message and the second NAT message, whether the IP address of the first terminal device in the network is the same as the IP address of the second terminal device in the network, and the processing unit is further configured to determine, in a case in which the IP address of the first terminal device in the network is different from the IP address of the second terminal device in the network, that the first terminal device adopts a first traversal policy to perform NAT traversal.

The NAT traversal policy apparatus provided in an embodiment of this application determines, by separately obtaining the NAT type and the IP address of the first terminal device and the NAT type and the IP address of the second terminal device, that both the first terminal device and the second terminal device are of a symmetric NAT type, and determines whether the IP address of the first terminal device is the same as the IP address of the second terminal device. When the IP address of the first terminal device is different from the IP address of the second terminal device, NAT traversal is performed according to the first traversal policy. In this way, a NAT traversal success rate is improved.

With reference to the fifth aspect, in some implementations of the fifth aspect, the obtaining unit is further configured to obtain a first identity ID message and a second ID message, where the first ID message indicates an ID of the first terminal device, and the second ID message indicates an ID of the second terminal device. The processing unit is configured to determine a parameter of the first traversal policy based on the first ID message and the second ID message.

With reference to the fifth aspect, in some implementations of the fifth aspect, the first NAT message further indicates a port of the first terminal device in the network, and the second NAT message further indicates a port of the second terminal device in the network. The first traversal policy includes a sending sequence of detection packets in each round, a quantity of sending rounds of detection packets, a sending quantity of the detection packets in each round, a destination port step of the detection packets in each round, initial values of destination ports of the detection packets in each round, and a destination IP address of the detection packets in each round. The destination port step of the detection packets in each round is a change value of a destination port of an $(i+1)^{th}$ detection packet in each round relative to a destination port of an $i^{th}$ detection packet in each round, where i is a positive integer. The initial values of the destination ports of the detection packets in each round are the port that is of the second terminal device in the network and that is indicated by the second NAT message. The destination IP address of the detection packets in each round is the IP address that is of the second terminal device in the network and that is indicated by the second NAT message.

With reference to the fifth aspect, in some implementations of the fifth aspect, a total sending quantity of the detection packets is less than or equal to a maximum sending quantity of packets allowed by a firewall flow control mechanism corresponding to the first terminal device; the quantity of the sending rounds of the detection packets is 1; the sending quantity of the detection packets in each round is 128; and/or the destination port step of the detection packets in each round is 1 or 2.

According to a sixth aspect, an apparatus for determining a network address translation NAT traversal policy is provided. The apparatus includes: an obtaining unit, configured to obtain a first NAT message, where the first NAT message indicates a NAT type of a first terminal device and an Internet protocol IP address of the first terminal device in a network, the NAT type includes symmetric NAT and cone NAT, and the obtaining unit is further configured to obtain a second NAT message, where the second NAT message indicates a NAT type of a second terminal device and an IP address of the second terminal device in the network; a processing unit, configured to determine, based on the first NAT message and the second NAT message, that both the NAT type of the first terminal device and the NAT type of the second terminal device are symmetric NAT, where the processing unit is further configured to determine, based on the first NAT message and the second NAT message, whether the IP address of the first terminal device in the network is the same as the IP address of the second terminal device in the network, and the processing unit is further configured to determine, in a case in which the IP address of the first terminal device in the network is the same as the IP address of the second terminal device in the network, that the first terminal device adopts a second traversal policy to perform NAT traversal.

The NAT traversal policy apparatus provided in an embodiment of this application determines, by separately obtaining the NAT type and the IP address of the first terminal device and the NAT type and the IP address of the second terminal device, that both the first terminal device and the second terminal device are of a symmetric NAT type, and determines whether the IP address of the first terminal device is the same as the IP address of the second terminal device. When the IP address of the first terminal device is the same as the IP address of the second terminal device, NAT traversal is performed according to the second traversal policy. In this way, a NAT traversal success rate is improved.

With reference to the sixth aspect, in some implementations of the sixth aspect, the obtaining unit is further configured to obtain a first identity ID message and a second ID message, where the first ID message indicates an ID of the first terminal device, and the second ID message indicates an ID of the second terminal device. The processing unit is configured to determine a parameter of the second traversal policy based on the first ID message and the second ID message.

With reference to the sixth aspect, in some implementations of the sixth aspect, the first NAT message further indicates a port of the first terminal device in the network, and the second NAT message further indicates a port of the second terminal device in the network. The second traversal policy includes the quantity of the sending rounds of the detection packets, the sending sequence of the detection packets in each round, the sending quantity of the detection packets in each round, the destination port step of the detection packets in each round, the initial values of the destination ports of the detection packets in each round, and the destination IP address of the detection packets in each round. The sending sequence of the detection packets in each round is sending first or sending later. The destination port step of the detection packets in each round is a change value of a destination port of an $(i+1)^{th}$ detection packet in each round relative to a destination port of an $i^{th}$ detection packet in each round, where i is a positive integer. The initial values of the destination ports of the detection packets in each round are the port that is of the second terminal device in the network and that is indicated by the second NAT message. The destination IP address of the detection packets in each round is the IP address that is of the second terminal device in the network and that is indicated by the second NAT message.

With reference to the sixth aspect, in some implementations of the sixth aspect, a sending quantity of the detection packets is less than or equal to a maximum sending quantity of packets allowed by a firewall flow control mechanism corresponding to the first terminal device; the quantity of the sending rounds of the detection packets is 2; the sending quantity of the detection packets in each round is 64; and/or a destination port step of detection packets in one round is 3, and a destination port step of detection packets in another round is 2, or the destination port step of the detection packets in each round is 1.

According to a seventh aspect, a network address translation NAT traversal apparatus is provided. The apparatus includes a sending unit, configured to send detection packets according to a first traversal policy, where the first traversal policy includes a sending quantity of the detection packets and a destination port step of the detection packets, the sending quantity of the detection packets is 128, the destination port step of the detection packets is 1 or 2, and the destination port step of the detection packets is a change value of a destination port of an $(i+1)^{th}$ detection packet relative to a destination port of an $i^{th}$ detection packet, where i is a positive integer.

The NAT traversal apparatus provided in an embodiment of this application sets the destination port step to 1 or 2, and sends 128 detection packets to perform NAT traversal, so that a NAT traversal success rate can be improved.

According to an eighth aspect, a network address translation NAT traversal apparatus is provided. The apparatus includes a sending unit, configured to send a first round of detection packets according to a second traversal policy, where the second traversal policy includes a quantity of sending rounds of detection packets, a sending quantity of detection packets in each round, and a destination port step of the detection packets in each round. The quantity of the sending rounds of the detection packets is 2; the sending quantity of the detection packets in each round is 64; and a destination port step of the detection packets in one round is 3, and a destination port step of the detection packets in another round is 2, or the destination port step of the detection packets in each round is 1.

The NAT traversal apparatus provided in an embodiment of this application sends two rounds of detection packets, where a destination port step is set to 1 in one round, and a destination port step is set to 2 in the other round, or a destination port step is set to 1 in both rounds, and 64 detection packets are sent in each round to perform NAT traversal, so that a NAT traversal success rate can be improved.

With reference to the eighth aspect, in some implementations of the eighth aspect, the second traversal policy further includes a sending sequence of the detection packets in each round. In a case in which the sending sequence of the detection packets in each round is sending first, the sending unit is further configured to: if no response packet is received within a target time period, send a second round of detection packets according to the second traversal policy, where the response packet indicates that the detection packets are received.

With reference to the eighth aspect, in some implementations of the eighth aspect, the second traversal policy further includes a sending sequence of the detection packets in each round. The apparatus further includes a receiving unit. The receiving unit is configured to: in a case in which the sending sequence of the detection packets in each round is sending later, before sending the first round of the detection packets according to the second traversal policy, receive first indication information, where the first indication information indicates to send the first round of the detection packets.

With reference to the eighth aspect, in some implementations of the eighth aspect, the second traversal policy further includes the sending sequence of the detection packets in each round. The receiving unit is further configured to: in a case in which the sending sequence of the detection packets in each round is sending later, receive second indication information, where the second indication information indicates to send a second round of detection packets. The sending unit is further configured to send the second round of the detection packets according to the second traversal policy.

According to a ninth aspect, a communication apparatus is provided. The communication apparatus includes a processor and a memory. The memory is configured to store computer-readable instructions, and the processor is configured to read the computer-readable instructions to implement the method according to any one of the first aspect to the fourth aspect and some implementations of the first aspect to some implementations of the fourth aspect.

According to a tenth aspect, a computer-readable storage medium is provided. The computer-readable storage medium stores a program or instructions, and when the program or the instructions are executed, a computer is enabled to perform the method according to any one of the first aspect to the fourth aspect and some implementations of the first aspect to some implementations of the fourth aspect.

According to an eleventh aspect, a chip is provided, including at least one processor and an interface circuit. The interface circuit is configured to provide program instructions or data for the at least one processor, and the at least one processor is configured to execute the program instructions, to implement the method according to any one of the first aspect to the fourth aspect and some implementations of the first aspect to some implementations of the fourth aspect.

According to a twelfth aspect, a computer program product is provided, including computer instructions. When the computer instructions are run on an electronic device, the method according to any one of the first aspect to the fourth aspect and some implementations of the first aspect to some implementations of the fourth aspect is enabled to be performed.

According to a thirteenth aspect, a communication system is provided, including a first terminal device and a second terminal device. The first terminal device is configured to implement the method according to any one of the first aspect to the fourth aspect and some implementations of the first aspect to some implementations of the fourth aspect.

According to a fourteenth aspect, a communication system is provided, including the apparatus according to any one of the fifth aspect to the eighth aspect and some implementations of the fifth aspect to some implementations of the eighth aspect.

BRIEF DESCRIPTION OF DRAWINGS

FIG. 6 is a schematic flowchart of a NAT traversal method according to an embodiment of this application;

FIG. 7 is a schematic flowchart of determining a NAT traversal policy according to an embodiment of this application;

FIG. 8 is a schematic flowchart of determining a NAT traversal policy according to an embodiment of this application;

DESCRIPTION OF EMBODIMENTS

Figure 1:
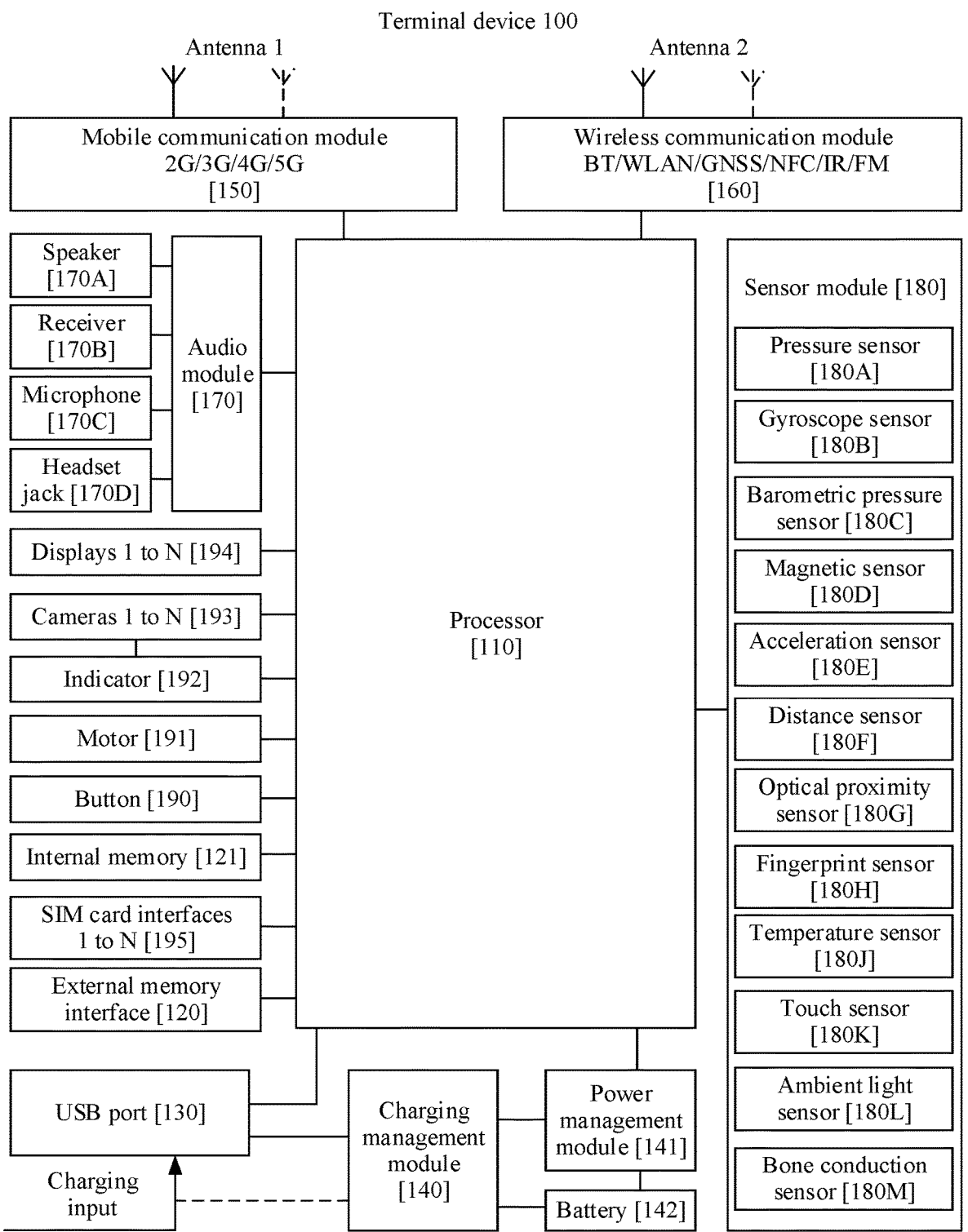
FIG. 1 is a schematic diagram of a structure of a terminal device according to an embodiment of this application.

The following clearly and completely describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

For ease of understanding of embodiments of this application, the following descriptions are first provided before embodiments of this application are described.

First, in embodiments of this application, an "indication" may include a direct indication and an indirect indication, or may include an explicit indication and an implicit indication. Information indicated by a message (for example, first response message described below) is referred to as to-be-indicated information. In a specific implementation process, the to-be-indicated information may be indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or pre-agreed on. For example, specific information may alternatively be indicated by using an arrangement sequence of a plurality of pieces of information that is pre-agreed on (for example, stipulated in a protocol), to reduce indication overheads to some extent.

Second, the terms "first", "second", and various numbers in the following embodiments are merely used for differentiation for ease of description, and are not intended to limit the scope of embodiments of this application. For example, different NAT detection messages are distinguished.

Third, in the following embodiments, "predefinition" and "preselection rule" may be implemented by pre-storing corresponding code, tables, or manners that may indicate related information in a device (for example, a terminal device). A specific implementation thereof is not limited in this application.

Fourth, a "protocol" in embodiments of this application may be a standard protocol in the communication field, for example, may include an LTE protocol, an NR protocol, and a related protocol applied to a future communication system. This is not limited in this application.

The technical solutions in embodiments of this application may be applied to various communication systems, for example, a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), a worldwide interoperability for microwave access (worldwide interoperability for microwave access, WiMAX) communication system, a future 5th generation (5th generation, 5G) system, or a new radio (new radio, NR) system.

A terminal device in embodiments of this application may be user equipment, an access terminal, a subscriber unit, a remote terminal, a mobile device, a user terminal, a terminal, a wireless communication device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), or the like. This is not limited in embodiments of this application.

For example, FIG. 1 is a schematic diagram of a structure of a terminal device 100 according to an embodiment of this application.

For example, as shown in FIG. 1, the terminal device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that, a structure illustrated in this embodiment of this application does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the terminal device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like. The I2C interface is a two-way synchronous serial bus, including a serial data line (serial data line, SDA) and a serial clock line (serial clock line, SCL). The I2S interface may be used to perform audio communication. In some embodiments, the processor 110 may include a plurality of groups of I2S buses. The processor 110 may be coupled to the audio module 170 through the I2S bus, to implement communication between the processor 110 and the audio module 170. The PCM interface may also be used to perform audio communication, and sample, quantize, and code an analog signal. In some embodiments, the audio module 170 may be coupled to the wireless communication module 160 through a PCM bus interface. The UART interface is a universal serial data bus, and is used to perform asynchronous communication. The bus may be a two-way communication bus. The bus converts to-be-transmitted data between serial communication and parallel communication. In some embodiments, the UART interface is usually used to connect the processor 110 to the wireless communication module 160. The MIPI interface may be used to connect the processor 110 to a peripheral component like the display 194 or the camera 193. The GPIO interface may be configured by software. The GPIO interface may be configured as a control signal or a data signal. In some embodiments, the GPIO interface may be used to connect the processor 110 to the camera 193, the display 194, the wireless communication module 160, the audio module 170, the sensor module 180, or the like. The USB port 130 is an interface that conforms to a USB standard specification, and may be a mini USB port, a micro USB port, a USB type-C port, or the like. The USB port 130 may be used to connect to a charger to charge the terminal device 100, or may be used to transmit data between the terminal device 100 and a peripheral device.

It can be understood that an interface connection relationship between the modules illustrated in this embodiment of this application is merely an example for description, and does not constitute a limitation on the structure of the terminal device 100. In some other embodiments of this application, the terminal device 100 may alternatively use different interface connection manners in the foregoing embodiments or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input by using a wireless charging coil of the terminal device 100. The charging management module 140 supplies power to an electronic device through the power management module 141 while charging the battery 142. The power management module 141 is configured to connect to the battery 142, the charging management module 140, and the processor 110.

A wireless communication function of the terminal device 100 may be implemented by using the antenna 1, the antenna 2, the mobile communication module 150, the wireless communication module 160, the modem processor, the baseband processor, and the like.

The mobile communication module 150 may provide a wireless communication solution that includes 2G/3G/4G/5G or the like and that is applied to the terminal device 100.

In some embodiments, the modem processor may be an independent component. In some other embodiments, the modem processor may be independent of the processor 110, and is disposed in a same device as the mobile communication module 150 or another function module.

The wireless communication module 160 may provide a wireless communication solution that includes a wireless local area network (wireless local area network, WLAN)

(for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the terminal device 100.

In some embodiments, the antenna 1 of the terminal device 100 is coupled to the mobile communication module 150, and the antenna 2 thereof is coupled to the wireless communication module 160, so that the terminal device 100 can communicate with a network and another device by using a wireless communication technology.

The terminal device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), or may be a display panel made of one of materials such as an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, or a quantum dot light emitting diode (quantum dot light emitting diode, QLED). In some embodiments, the terminal device 100 may include one or N displays 194, where N is a positive integer greater than 1.

The terminal device 100 may implement an image shooting function by using the ISP, the camera 193, the video codec, the GPU, the display 194, the application processor, and the like.

The external memory interface 120 may be configured to connect to an external memory card, for example, a micro SD card, to extend a storage capability of the terminal device 100. The internal memory 121 may be configured to store computer-executable program code. The executable program code includes instructions. The processor 110 runs the instructions stored in the internal memory 121, to perform various function applications of the terminal device 100 and data processing.

The terminal device 100 can implement an audio function like music playing or recording through the audio module 170, the speaker 170A, the receiver 170B, the microphone 170C, the headset jack 170D, the application processor, and the like. The audio module 170 is configured to convert digital audio information into an analog audio signal for output, and is also configured to convert an analog audio input into a digital audio signal. The speaker 170A, also referred to as a "loudspeaker", is configured to convert an electrical audio signal into a sound signal. The receiver 170B, also referred to as an "earpiece", is configured to convert an electrical audio signal into a sound signal. The microphone 170C, also referred to as a "mike" or a "mic", is configured to convert a sound signal into an electrical signal. The headset jack 170D is configured to connect to a wired headset.

The pressure sensor 180A is configured to sense a pressure signal, and can convert the pressure signal into an electrical signal. In some embodiments, the pressure sensor 180A may be disposed in the display 194. The gyroscope sensor 180B may be configured to determine a motion posture of the terminal device 100. The barometric pressure sensor 180C is configured to measure barometric pressure. In some embodiments, the terminal device 100 calculates an altitude through the barometric pressure measured by the barometric pressure sensor 180C, to assist in positioning and navigation. The acceleration sensor 180E may detect values of accelerations of the terminal device 100 in various directions (usually on three axes). The distance sensor 180F is configured to measure a distance. The fingerprint sensor 180H is configured to collect a fingerprint. The touch sensor 180K is also referred to as a "touch panel". The touch sensor 180K may be disposed on the display 194, and the touch sensor 180K and the display 194 constitute a touchscreen, which is also referred to as a "touch screen". The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal.

The button 190 includes a power button, a volume button, and the like. The motor 191 may generate a vibration prompt. The indicator 192 may be an indicator light, and may be configured to indicate a charging status and a power change, or may be configured to indicate a message, a missed call, a notification, and the like. The SIM card interface 195 is used to connect to a SIM card.

A software system of the terminal device 100 shown in FIG. 1 may use a layered architecture, an event-driven architecture, a microkernel architecture, a microservice architecture, or a cloud architecture.

The software system is not limited in embodiments of this application. For example, the software system may be an Android® system, an iOS® system, a HarmonyOS® system, or the like.

Figure 2:
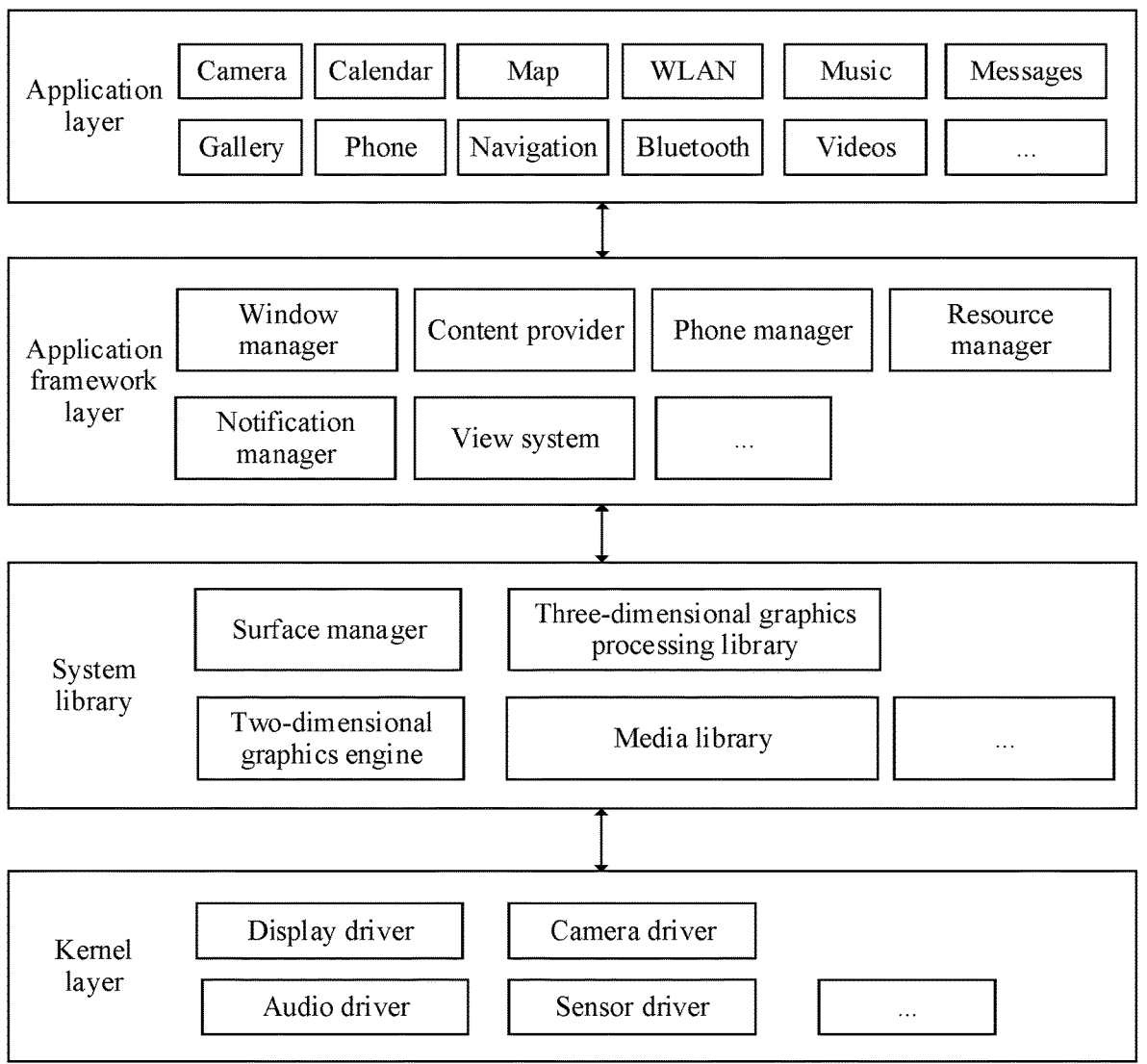
FIG. 2 is a schematic diagram of a software structure of a terminal device according to an embodiment of this application.

With reference to FIG. 2, a software structure of the terminal device 100 is described below by using an Android® system with a layered architecture as an example.

FIG. 2 is a block diagram of the software structure of the terminal device 100 according to an embodiment of this application. In the layered architecture, software is divided into several layers, and each layer has a clear role and task. The layers communicate with each other through a software interface. In some embodiments, the Android system is divided into four layers: an application layer, an application framework layer, system library, and a kernel layer from top to bottom. The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmark, a phone book, and the like.

The view system includes visual controls such as a control for displaying a text and a control for displaying an image. The view system may be configured to establish an application. A display interface may include one or more views. For example, a display interface including an SMS message notification icon may include a view for displaying a text and a view for displaying an image.

The phone manager is configured to provide a communication function of the terminal device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The displayed notification information may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The application layer and the application framework layer run on the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (media library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

A NAT technology is a technology for translating an internal network address into an external network address. This technology can not only resolve a problem of insufficient Internet protocol (Internet protocol, IP) addresses, but also effectively avoid an attack from outside a network, and hide and protect a terminal inside the network.

For ease of understanding, the NAT technology is described with reference to FIG. 3.

Figure 3:
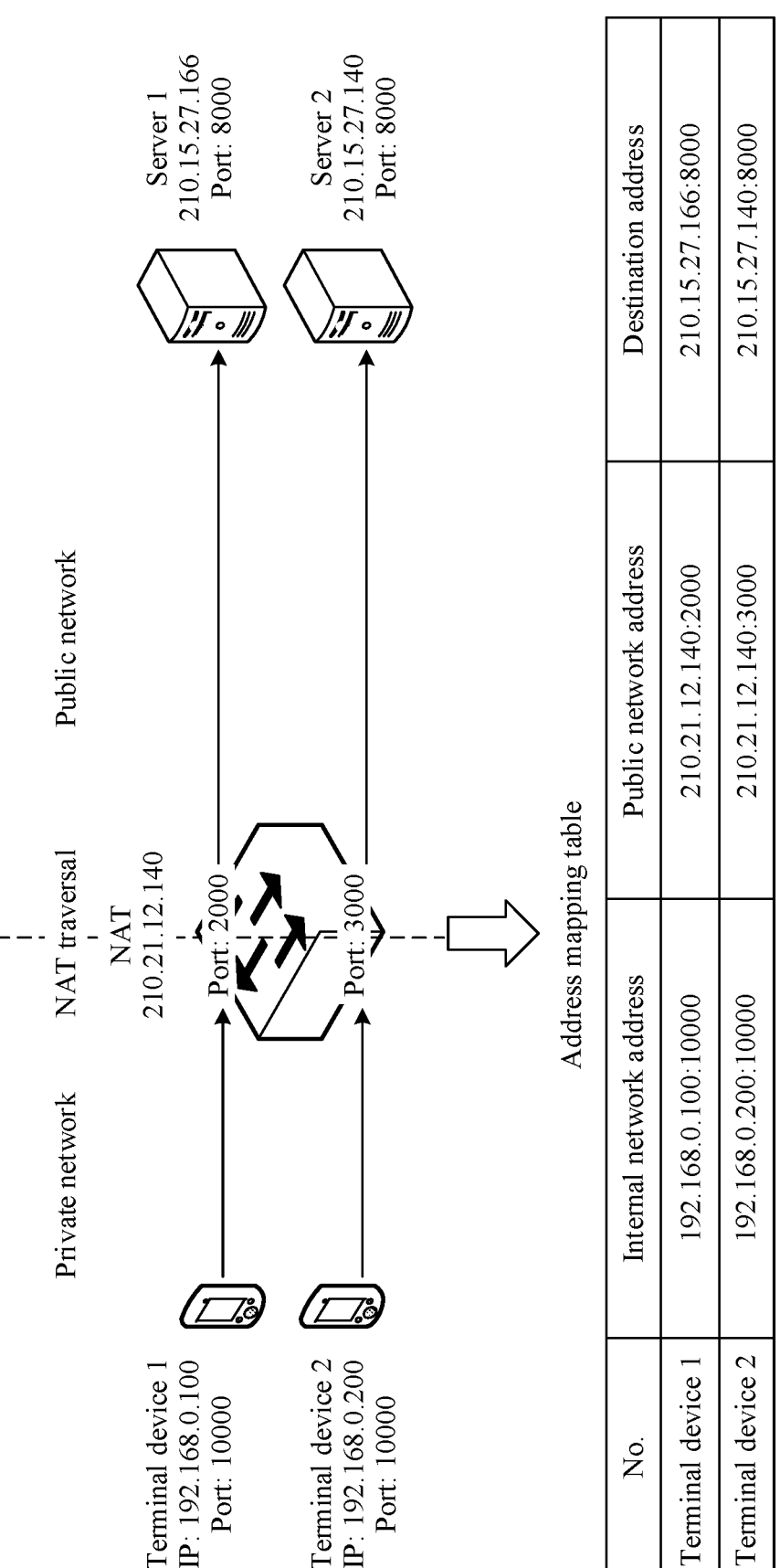
FIG. 3 is a schematic diagram of a working procedure of a NAT device according to an embodiment of this application.

FIG. 3 is a schematic diagram of a working procedure of a NAT device.

For example, as shown in FIG. 3, the NAT device divides the Internet into two parts: a private network and a public network. The public network is a valid external global IP address, and the private network is a dedicated address used only in a local private network. When a terminal device using a private network IP address communicates with the outside, the terminal device needs to translate the local private network address into a global IP address by using a NAT device, so that the terminal device can connect to another device on the Internet. The NAT device maintains an address mapping table, where the address mapping table records an internal network address of the terminal device, a public network address after mapping, and a destination address, and the mapping table is empty initially. For example, the address mapping table shown in FIG. 3 records source addresses and mapped addresses of a terminal device 1 and a terminal device 2. An internal network address of the terminal device 1 is 192.168.0.100:10000, and a destination address for performing peer-to-peer communication is 210.15.27.166:8000. The NAT device performs public network address mapping on the internal network address of the terminal device 1, and a public network address after mapping is 210.21.12.140:2000. When the terminal device 1 communicates with a peer end at a destination address, the terminal device 1 needs to communicate with the peer end based on the public network address after mapping. An internal network address of the terminal device 2 is 192.168.0.200:10000, and a destination address for performing peer-to-peer communication is 210.15.27.140:8000. The NAT device performs public network address mapping on the internal network address of the terminal device 2, and a public network address after mapping is 210.21.12.140: 3000. When the terminal device 2 communicates with a peer end at a destination address, the terminal device 2 needs to communicate with the peer end based on the public network address after mapping.

Therefore, two terminal devices can communicate with each other only by using the NAT device. In this way, NAT traversal needs to be performed to establish peer-to-peer (peer-to-peer, P2P) communication between two terminal devices.

The P2P communication means that a point-to-point communication link is established between the two terminal devices based on an Internet Protocol (Internet Protocol, IP) address. Currently, common P2P communication services include but are not limited to file sharing and downloading, audio and video calls, and network live streaming media.

A network address translation (network address translation, NAT) traversal technology is a very important technology. The NAT traversal technology enables clients to directly communicate with each other. This helps reduce a peer-to-peer delay, and reduce pressure and costs of a server.

Currently, a NAT traversal technology based on a birthday attack algorithm requires each end to send a large quantity of packets (generally more than 1000 packets). As a result, a large quantity of packets are sent, a traversal success rate is low, and NAT traversal is easily affected by firewall flow control. A NAT traversal technology based on a relay forwarding technology requires deployment of a forwarding server, resulting in high communication costs.

Therefore, an embodiment of this application provides a NAT traversal technology, which can ensure a low packet sending quantity of each end, is not easily affected by firewall flow control, and has a high traversal success rate and low costs.

Currently, based on a difference in IP address translation behavior of a NAT device, a NAT type may be classified into cone NAT (cone NAT) and symmetric NAT (symmetric NAT). When the NAT type is cone NAT, a cone NAT device fixedly translates one internal network address into one external network address. In this case, one-to-one mapping is performed. When the NAT type is symmetric NAT, a symmetric NAT device may translate one internal network address into a plurality of external network addresses. In this case, one-to-many mapping is performed.

A method for determining a NAT traversal policy provided in embodiments of this application is applicable to a communication system of a "symmetric NAT-symmetric NAT" networking type.

For example, the communication system includes at least two terminal devices (for example, a terminal device A and a terminal device B described below). The terminal device A accesses a network by using a NAT a device, the terminal device B accesses the network by using a NAT b device, and the terminal device A and the terminal device B are terminal devices that need to perform NAT traversal. The network may be the public network described above.

In some embodiments, in addition to the two terminal devices, the communication system further includes a detection apparatus. The detection apparatus may learn some information of the two terminal devices, for example, a NAT type, an IP address, and a port that are described below.

A specific structure of the detection apparatus is not limited in embodiments of this application, provided that a function of learning information about the two terminal devices can be implemented. The following uses an example in which the detection apparatus is a detection server for description.

Figure 4:
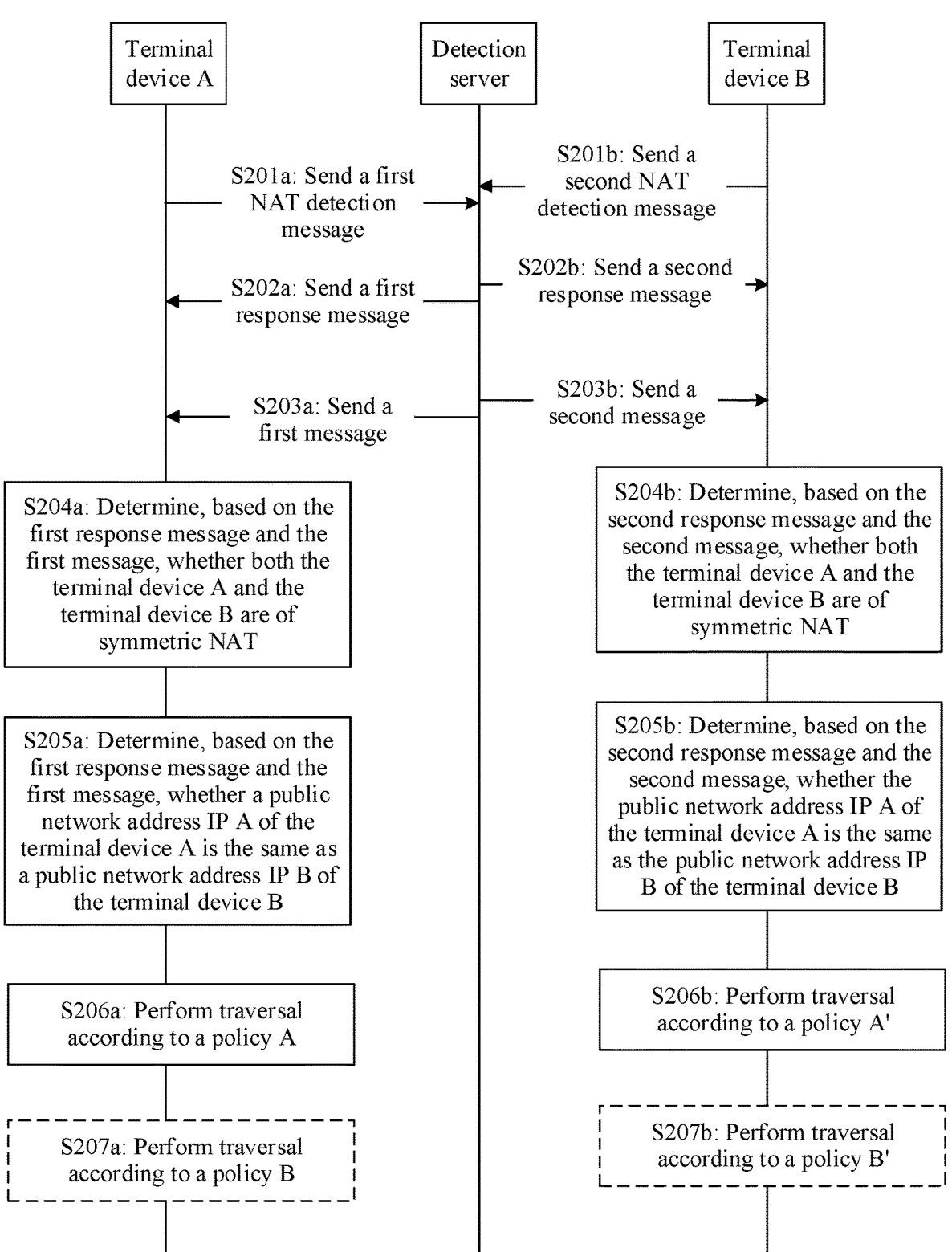
FIG. 4 is a schematic flowchart of determining a NAT traversal policy according to an embodiment of this application.
Figure 5:
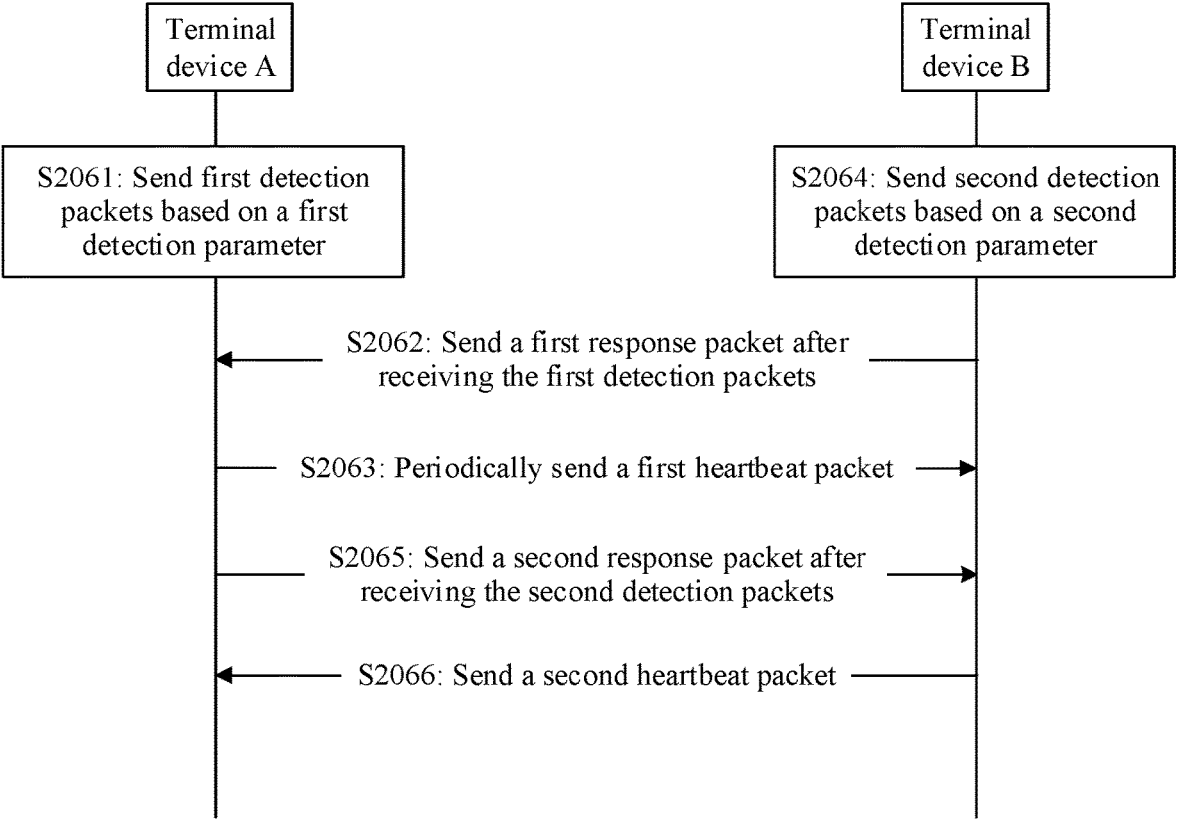
FIG. 5 is a schematic flowchart of a NAT traversal method according to an embodiment of this application.

With reference to FIG. 4 to FIG. 6, the following describes in detail a method 200 for determining a NAT traversal policy according to an embodiment of this application.

As shown in FIG. 4, the method 200 includes S201*a* to S209*a* and S201*b* to S209*b*. The following describes S201*a* to S209*a* and S201*b* to S209*b*.

First, a terminal device A and a terminal device B need to first query a NAT type, an IP address, and a port of each terminal device in a network accessed by using a NAT device that is connected to each terminal device. A specific process is described in S201*a*, S202*a*, S201*b*, and S202*b* below.

It should be understood that the IP address may be understood as an IP address that is in the network and that is configured by the NAT device connected to the terminal device for the terminal device. The port may be understood as a port that is in the network and that is configured by the NAT device connected to the terminal device for the terminal device.

It should be understood that, when the network is the public network described above, the IP address may be referred to as a public network IP address, and the port may alternatively be referred to as a public network port. The following uses the public network IP address and the public network port as an example for description.

S201*a*: The terminal device A sends a first NAT detection message to the detection server, and correspondingly, the detection server receives the first NAT detection message sent by the terminal device A.

The first NAT detection message is used to request the detection server to feed back a NAT type of the terminal device A, a public network address of the terminal device A, and a public network port of the terminal device A.

It should be understood that the first NAT detection message may be any type of message. After receiving the any type of message sent by the terminal device A, the detection server may learn the NAT type of the terminal device A, the public network address of the terminal device A, and the public network port of the terminal device A.

S202*a*: The detection server sends a first response message for the first NAT detection message to the terminal device A, and correspondingly, the terminal device A receives the first response message that is sent by the detection server and that is for the first NAT detection message.

The first response message indicates the NAT type of the terminal device A, the public network address of the terminal device A, and the public network port of the terminal device A.

S201*b*: The terminal device B sends a second NAT detection message to the detection server, and correspondingly, the detection server receives the second NAT detection message sent by the terminal device B.

The second NAT detection message is used to request the detection server to feed back a NAT type of the terminal device B, a public network address of the terminal device B, and a public network port of the terminal device B.

It should be understood that the second NAT detection message may be any type of message. After receiving the any type of message sent by the terminal device B, the detection server may learn the NAT type of the terminal device B, the public network address of the terminal device B, and the public network port of the terminal device B.

S202*b*: The detection server sends a second response message for the second NAT detection message to the terminal device B, and correspondingly, the terminal device A receives the second response message that is sent by the detection server and that is for the second NAT detection message.

The second response message indicates the NAT type of the terminal device B, the public network address of the terminal device B, and the public network port of the terminal device B.

In this embodiment of this application, S202*a* is performed after S201*a*, and S202*b* is performed after S201*b*. An execution sequence of S201*a* and S201*b* and an execution sequence of S201*a* and S202*b* are not limited, and an execution sequence of S201*b* and S201*a* and an execution sequence of S201*b* and S202*a* are not limited either.

Second, the detection server may exchange obtained NAT messages of a plurality of terminal devices. The NAT message includes a NAT type, a public network address, and a public network port of a terminal device in a network accessed by the terminal device. A specific process is described in S203*a* and S203*b* below.

S203*a*: The detection server sends a first message to the terminal device A, that is, the detection server notifies the terminal device A of the detected NAT message of the terminal device B, and correspondingly, the terminal device A receives the first message sent by the detection server.

The first message indicates the NAT type of the terminal device B, the public network address of the terminal device B, and the public network port of the terminal device B.

In some embodiments, the detection server may further notify the terminal device A of a NAT message that indicates a NAT type, a public network address, and a public network port of another terminal device other than the terminal device B in a network accessed by the another terminal device.

S203b: The detection server sends a second message to the terminal device B, that is, the detection server notifies the terminal device B of a detected NAT message of the terminal device A, and correspondingly, the terminal device B receives the second message sent by the detection server.

The second message indicates the NAT type of the terminal device A, the public network address of the terminal device A, and the public network port of the terminal device A.

In some embodiments, the detection server may further notify the terminal device B of a NAT message that indicates a NAT type, a public network address, and a public network port of another terminal device other than the terminal device A in a network accessed by the another terminal device.

In this embodiment of this application, S203a is performed after S201b, and S203b is performed after S201a. An execution sequence of S203a and S201a, an execution sequence of S203a and S202a, an execution sequence of S203a and S202b, and an execution sequence of S203a and S203b are not limited, and an execution sequence of S203b and S201b, an execution sequence of S203b and S202a, an execution sequence of S203b and S202b, and an execution sequence of S203b and S203a are not limited.

In some embodiments, S202a and S203a may be implemented by using one step. In this case, an execution sequence of the step and S202b and an execution sequence of the step and S203b are not limited.

In some embodiments, S202b and S203b may be implemented by using one step. In this case, an execution sequence of the step and S202a and an execution sequence of the step and S203a are not limited.

Third, after receiving the NAT message of the another terminal device, each terminal device determines which policy is used to perform NAT traversal, that is, determines a NAT traversal policy, so as to implement direct communication between the terminal device and the another terminal device.

In some embodiments, in addition to determining which policy is used by the terminal device A to perform NAT traversal, the terminal device A further determines which policy is used by the terminal device B to perform NAT traversal. In a case in which IP A≠IP B, the specific process includes S204a, S205a, and S206a described below, and in S206a, the terminal device A further determines that the terminal device B performs NAT traversal according to a policy A'. In a case in which IP A=IP B, the specific process includes S204a, S205a, and S207a described below, and in S207a, the terminal device A further determines that the terminal device B performs NAT traversal according to a policy B' (an example of a second traversal policy).

In addition, the terminal device A further notifies the terminal device B of the determined NAT traversal policy used by the terminal device B through the detection server, so that the terminal device B may know the NAT traversal policy used by the terminal device B.

In some other embodiments, in addition to determining which policy is used by the terminal device B to perform NAT traversal, the terminal device B further determines which policy is used by the terminal device A to perform NAT traversal. In a case in which IP A≠IP B, the specific process includes S204b, S205b, and S206b described below, and in S206b, the terminal device B further determines that the terminal device A performs NAT traversal according to a policy A (an example of a first traversal policy). In a case in which IP A=IP B, the specific process includes S204b, S205b, and S207b described below, and in S207b, the terminal device B further determines that the terminal device A performs NAT traversal according to a policy B (an example of the second traversal policy).

In addition, the terminal device B further notifies the terminal device A of the determined NAT traversal policy used by the terminal device A through the detection server, so that the terminal device A may know the NAT traversal policy used by the terminal device A.

In some other embodiments, the terminal device A determines which policy is used by the terminal device A to perform NAT traversal, and the terminal device B determines which policy is used by the terminal device B to perform NAT traversal. In a case in which IP A≠IP B, the specific execution process of the terminal device A includes S204a, S205a, and S206a described below, and the specific execution process of the terminal device B includes S204b, S205b, and S206b described below. In a case in which IP A=IP B, the specific execution process of the terminal device A includes S204a, S205a, and S207a described below, and the specific execution process of the terminal device B includes S204b, S205b, and S207b described below.

An execution sequence of first determining a specific policy used by one terminal device to perform NAT traversal, and then determining a specific policy used by another terminal device to perform NAT traversal is not limited in embodiments of this application. That is, an execution sequence of S204a and S204b, an execution sequence of S204a and S205b, an execution sequence of S205a and S204b, and an execution sequence of S205a and S205b are not limited.

The following first describes how the terminal device A determines which policy is used to perform NAT traversal.

S204a: The terminal device A determines, based on the first response message and the first message, whether both the NAT type of the terminal device A and the NAT type of the terminal device B are symmetric NAT.

If a NAT type of at least one of the terminal device A and the terminal device B is not symmetric NAT, the following steps are not required.

When both the NAT type of the terminal device A and the NAT type of the terminal device B are symmetric NAT, S205a is performed.

S205a: The terminal device A determines, based on the first response message and the first message, whether the public network address IP A of the terminal device A is same as the public network address IP B of the terminal device B.

In a case in which IP A≠IP B, the terminal device A determines that the terminal device A performs NAT traversal according to the policy A, that is, S206a is performed.

In a case in which IP A=IP B, the terminal device A determines that the terminal device A performs NAT traversal according to the policy B, that is, S207a is performed.

In some embodiments, the terminal device A may input content indicated by the first response message and content indicated by the first message into a policy algorithm module, and the policy algorithm module may output, by using a corresponding policy algorithm, each parameter of the policy used by the terminal device A.

Optionally, if the policy algorithm module outputs two policies, in some embodiments, the terminal device A may determine a policy, and notify the terminal device B of the determined policy through the detection server, so that the terminal device B can avoid using a policy that is the same as the policy of the terminal device A. Certainly, the terminal device A may not notify the terminal device B of the determined policy, and the terminal device A and the terminal device B may use the same policy. In the following descriptions, the terminal device A and the terminal device B use different policies.

In some other embodiments, the terminal device A may further obtain an ID of the terminal device A and an ID of the terminal device B from the detection server. In addition, the ID of the terminal device A, the ID of the terminal device B, the content indicated by the first response message, and the content indicated by the first message are input into the policy algorithm module. The policy algorithm module may output, by using a corresponding policy algorithm, each parameter of a policy used by a terminal device.

A specific form of an ID of the terminal device is not limited in embodiments of this application, provided that the ID can uniquely identify one terminal device.

For example, the ID of the terminal device A may be carried in the first response message in S202a, and the ID of the terminal device B may be carried in the first message in S203a. Alternatively, the ID of the terminal device A and the ID of the terminal device B may be transmitted to the terminal device A through another message.

For example, it may be preset that a terminal device with a larger ID value uses one policy, and a terminal device with a smaller ID value uses another policy. In this way, traversal policies finally determined by the two terminal devices are different.

For example, in a case in which IP A≠IP B, if the ID of the terminal device A is greater than the ID of the terminal device B, the terminal device A uses the policy A, and the terminal device B uses the policy A'.

For example, in a case in which IP A=IP B, if the ID of the terminal device A is greater than the ID of the terminal device B, the terminal device A uses the policy B, and the terminal device B uses the policy B'.

Whether the ID of the terminal device A and the ID of the terminal device B are carried in a same message or different messages is not limited in embodiments of this application.

For example, the parameter of the policy may include a quantity of sending rounds of packets, a sending sequence of packets in each round, a sending quantity of the packets, a destination port step in each round, initial values of destination ports in each round, and a destination IP address in each round. The quantity of the sending rounds of the packets is a quantity of rounds that the packets need to be sent. The sending sequence of the packets includes sending first, sending later, and no sequence. The destination port step is a change value of destination ports of two consecutive detection packets. The sending quantity of the packets is a quantity of packets to be sent in one round.

That the sending sequence of the packets is no sequence may be understood as that there is no limitation on the sending sequence of the packets.

In some embodiments, the destination port step in each round and the initial values of the destination ports in each round may be replaced with a destination port of each detection packet in each round.

A specific indication form of the destination port of each detection packet in each round is not limited in embodiments of this application. For example, the destination port of each detection packet in each round may be indicated by a formula.

A manner of determining the sending sequence of the packets is not limited in embodiments of this application.

For example, in some embodiments, the sending sequence of the packets may be pre-specified, for example, may be pre-specified in a protocol. In some other embodiments, the sending sequence of the packets may be negotiated in real time. For example, through negotiation by using the detection server, one of the terminal device A and the terminal device B sends a packet first, and another terminal device sends a packet later.

It should be understood that the following uses an example in which the terminal device A sends the packet first and the terminal device B sends the packet later for description. In some embodiments, alternatively, the terminal device B may send the packet first, and the terminal device A sends the packet later.

In a case in which IP A≠IP B, because a destination port used by the terminal device A to send a detection packet is different from a destination port used by the terminal device B to send a detection packet, mutual impact is small when both the terminal device A and the terminal device B send detection packets. Therefore, the terminal device A and the terminal device B each may send only one round of detection packets. In this way, a NAT traversal success rate can be ensured, and power consumption of the terminal device A and/or the terminal device B can also be reduced.

In a case in which IP A=IP B, because the destination port used by the terminal device A to send the detection packet may be the same as the destination port used by the terminal device B to send the detection packet, mutual impact is large when both the terminal device A and the terminal device B send detection packets. Therefore, to improve a NAT traversal success rate of the terminal device A and/or the terminal device B, the terminal device A and the terminal device B each may send at least two rounds of detection packets.

In some embodiments, to avoid triggering a firewall flow control mechanism of the terminal device A and/or the terminal device B, a quantity of detection packets sent by the terminal device A and a quantity of detection packets sent by the terminal device B may be set to be less than or equal to a maximum sending quantity of packets allowed by a firewall flow control mechanism of a corresponding terminal device. For example, as shown in Table 1, sending quantities of packets of the terminal device A and the terminal device B are both 128.

A sending quantity of packets of the terminal device A and a sending quantity of packets of the terminal device B may be the same or different. This is not limited in embodiments of this application.

In some embodiments, the sending quantity of the packets may be pre-specified, for example, may be pre-specified in a protocol. In some other embodiments, the sending quantity of the packets may be determined in real time, for example, is determined in real time based on the maximum sending quantity of the packets allowed by the firewall flow control mechanism of the terminal device.

In some embodiments, the sending quantity of the packets may be adjusted based on an actual situation to improve a NAT traversal success rate.

It should be understood that a destination port step of the terminal device A and a destination port step of the terminal device B may be the same or may be different. This is not limited in embodiments of this application.

In some embodiments, the destination port step of the terminal device A and the destination port step of the terminal device B are generally set to be different to improve the NAT traversal success rate.

For example, Table 1 shows policies used by the terminal devices and parameters of the policies.

TABLE 1

| | IP A ≠ IP B | | IPA = IP B | | | |
| --- | --- | --- | --- | --- | --- | --- |
| | Device | | | | | |
| | Terminal device A | Terminal device B | Terminal device A | | Terminal device B | |
| | Policy | | | | | |
| | Policy A | Policy A' | Policy B | | Policy B' | |
| | Quantity of rounds | | | | | |
| | | | 2 round | | 2 round | |
| | 1 round | 1 round | First round | Second round | First round | Second round |
| Sending sequence of packets | No sequence | | Sending first | Sending first | Sending later | Sending later |
| Sending quantity of packets | 128 | 128 | 64 | 64 | 64 | 64 |
| Destination port step | 1 | 2 | 3 | 2 | 1 | 1 |
| Initial value of a destination port | PORT B | PORT A | PORT B | PORT..B | PORT A | PORT A |
| Destination IP address | IP B | IP A | IP B | IP B | IP A | IP A |

As shown in Table 1, in the case in which IP A≠IP B, the terminal device A performs NAT traversal according to the policy A. Parameters of the policy A are as follows: A quantity of sending rounds of packets is 1; the sending sequence of the packets is no sequence; the sending quantity of the packets is 128; the destination port step is 1; the initial value of the destination port is PORT B, where PORT B is the public network port of the terminal device B; and the destination IP address is IP B. In this case, a destination port of an $i^{th}$ detection packet is PORT B+i×1, where i=1, 2, 3, . . . , 128.

As shown in Table 1, in the case in which IP A=IP B, the terminal device A performs NAT traversal according to the policy B. Parameters of the policy B are as follows: A quantity of sending rounds of packets is 2, and in a process of sending the first round of packets, the sending sequence of the packets is sending first; the sending quantity of the packets is 64; the destination port step is 3; the initial value of the destination port is PORT B; and the destination IP address is IP B. In this case, a destination port of an $i^{th}$ detection packet in the first round is PORT B+i×3, where i=1, 2, 3, . . . , 64. In a process of sending the second round of packets, the sending sequence of the packets is sending first; the sending quantity of the packets is 64; the destination port step is 2; the initial value of the destination port is PORT B; and the destination IP address is IP B. In this case, a destination port of an $i^{th}$ detection packet in the second round is PORT B+i×2, where i=1, 2, 3, . . . , 64.

The following describes how the terminal device B determines which policy is used to perform NAT traversal.

S204b: The terminal device B determines, based on the second response message and the second message, whether both the NAT type of the terminal device A and the NAT type of the terminal device B are symmetric NAT.

It should be understood that determining results of S204a and S204b are consistent. To be specific, if the terminal device A determines, in S204a, that both the NAT type of the terminal device A and the NAT type of the terminal device B are symmetric NAT, the terminal device B also determines, in S204b, that both the NAT type of the terminal device A and the NAT type of the terminal device B are symmetric NAT. If the terminal device A determines, in S204a, that the NAT type of the at least one of the terminal device A and the terminal device B is not symmetric NAT, the terminal device B also determines, in S204b, that the NAT type of the at least one of the terminal device A and the terminal device B is not symmetric NAT.

If the NAT type of the at least one of the terminal device A and the terminal device B is not symmetric NAT, the following steps are not required.

When both the NAT type of the terminal device A and the NAT type of the terminal device B are symmetric NAT, S205b is performed.

S205b: The terminal device B determines, based on the second response message and the second message, whether the public network address IP A of the terminal device A is same as the public network address IP B of the terminal device B.

It should be understood that determining results of S205a and S205b are consistent. To be specific, if the terminal device A determines, in S205a, that IP A≠IP B, the terminal device B also determines, in S205b, that IP A≠IP B. If the terminal device A determines, in S205a, that IP A=IP B, the terminal device B also determines, in S205b, that IP A=IP B.

In a case in which IP A≠IP B, the terminal device B determines that the terminal device B performs NAT traversal according to the policy A', that is, S206b is performed.

In a case in which IP A=IP B, the terminal device B determines that the terminal device B performs NAT traversal according to the policy B', that is, S207b is performed.

It should be understood that in some embodiments, when the terminal device B determines to use the policy A', the terminal device A determines to use the policy A. When the terminal device B determines to use the policy B', the terminal device A determines to use the policy B.

In some embodiments, the terminal device B may input content indicated by the second response message and content indicated by the second message into the policy algorithm module, and the policy algorithm module may output, by using a corresponding policy algorithm, each parameter of a policy used by the terminal device.

Optionally, if the policy algorithm module outputs two policies, the terminal device B obtains, through the detection server, a policy determined by the terminal device A, so that the terminal device B uses a policy different from the policy of the terminal device A. Certainly, the terminal device B may alternatively not need to obtain the policy determined by the terminal device B, and the terminal device B and the terminal device A may use a same policy.

In some other embodiments, the terminal device B may further obtain the ID of the terminal device A and the ID of the terminal device B from the detection server. In addition, the ID of the terminal device A, the ID of the terminal device B, the content indicated by the second response message, and the content indicated by the second message are input into the policy algorithm module. The policy algorithm module may output, by using a corresponding policy algorithm, each parameter of a policy used by a terminal device.

For example, the ID of the terminal device A may be carried in the second message in S203$b$, and the ID of the terminal device B may be carried in the second response message in S202$b$. Alternatively, the ID of the terminal device A and the ID of the terminal device B may be transmitted to the terminal device B through another message.

Whether the ID of the terminal device A and the ID of the terminal device B are carried in a same message or different messages is not limited in embodiments of this application.

For example, for an example of a parameter included in the policy, refer to related descriptions in S205$a$ above. Details are not described herein again.

As shown in Table 1, in a case in which IP A≠IP B, the terminal device B performs NAT traversal according to the policy A'. Parameters of the policy A' are as follows: The quantity of the sending rounds of the packets is 1; the sending sequence of the packets is no sequence; the sending quantity of the packets is 128; the destination port step is 2; the initial value of the destination port is PORT A, where PORT A is the public network port of the terminal device A; and the destination IP address is IP A. In this case, a destination port of an i$^{th}$ detection packet is PORT A+i×1, where i=1, 2, 3, . . . , 128.

As shown in Table 1, in a case in which IP A=IP B, the terminal device B performs NAT traversal according to the policy B'. Parameters of the policy B' are as follows: The quantity of the sending rounds of the packets is 2, and in a process of sending the first round of the packets, the sending sequence of the packets is sending later; the sending quantity of the packets is 64; the destination port step is 1; the initial value of the destination port is PORT A+i×1, where i=1, 2, 3, . . . , 64; and the destination IP address is IP A. In this case, a destination port of an i$^{th}$ detection packet in the first round is PORT A+i×1, where i=1, 2, 3, . . . , 64. In a process of sending the second round of the packets, the sending sequence of the packets is sending later; the sending quantity of the packets is 64; the destination port step is 1; the destination port is PORT A+i×1, where i=1, 2, 3, . . . , 64; and the destination IP address is IP A. In this case, a destination port of an i$^{th}$ detection packet in the second round is PORT A+i×1, where i=1, 2, 3, . . . , 64.

In the method 200, when determining, by separately obtaining a NAT type and an IP address of a terminal device (for example, the terminal device A or the terminal device B) and a NAT type and an IP address of another terminal device (for example, the terminal device B or the terminal device A), that at least the terminal device and the another terminal device are of a symmetric NAT type, the terminal device determines whether the IP address of the terminal device is the same as the IP address of the another terminal device. When the IP address of the terminal device is different from the IP address of the another terminal device, the terminal device determines that the terminal device and the another terminal device both use one traversal policy to perform NAT traversal. When the IP address of the terminal device is the same as the IP address of the another terminal device, the terminal device determines that the terminal device and the another terminal device both use another traversal policy to perform NAT traversal. This improves the NAT traversal success rate.

In the case that each terminal device knows a traversal policy used by the terminal device, each terminal device may further perform NAT traversal according to the traversal policy determined by the terminal device.

The following describes a NAT traversal method provided in an embodiment of this application.

For ease of description, a parameter corresponding to the policy A is denoted as a first detection parameter, a parameter corresponding to the policy A' is denoted as a second detection parameter, a parameter corresponding to the policy B is denoted as a third detection parameter, and a parameter corresponding to the policy B' is denoted as a fourth detection parameter.

The following first describes how to perform NAT traversal by using an example in which the terminal device A determines to use the policy A to perform NAT traversal and the terminal device B determines to use the policy A' to perform NAT traversal.

FIG. 5 is a schematic flowchart of an example in which the terminal device A uses the policy A to perform NAT traversal, and the terminal device B uses the policy A' to perform NAT traversal according to an embodiment of this application.

For example, as shown in FIG. 5, a process in which the terminal device A uses the policy A to perform NAT traversal, and the terminal device B uses the policy A' to perform NAT traversal includes the following steps.

S2061: The terminal device A sends first detection packets based on the first detection parameter.

For example, the terminal device A continuously sends 128 first detection packets, destination IP addresses of the 128 first detection packets are all IP B, and a destination port of an i$^{th}$ first detection packet is PORT B+i×1.

After the terminal device B receives the first detection packets, the terminal device B may learn a public network IP address and a public network port that are for sending the first detection packets by the terminal device A. In this case, the terminal device B may send a first response packet to the terminal device A based on the public network IP address and the public network port that are for sending the first detection packets by the terminal device A, that is, S2062 is performed.

The first response packet may indicate that the sending terminal device B has received the first detection packets sent by the terminal device A.

When the terminal device A does not receive the first response packet within a first time period, the terminal device A fails to perform NAT traversal. In this case, the terminal device A may end NAT traversal.

The first time period is a first preset time period after the terminal device A sends all the first detection packets.

For example, the first preset time period may be preset.

After the terminal device A receives the first response packet, the terminal device A may learn a public network IP address and a public network port that are for sending the first response packet by the terminal device B, and the terminal device A may directly communicate with the terminal device B through the public network IP address and the public network port that are for sending the first response packet by the terminal device B, that is, the terminal device A successfully performs NAT traversal.

In some embodiments, after S2062, the terminal device A may further periodically send a first heartbeat packet to the terminal device B based on the public network IP address and the public network port that are for sending the first response packet by the terminal device B, that is, S2063 is performed.

In this case, if the terminal device B receives the first heartbeat packet sent by the terminal device A, it may be considered that the terminal device B successfully performs NAT traversal. If the terminal device B does not receive the first heartbeat packet sent by the terminal device A, it may be considered that the terminal device B fails to perform NAT traversal.

S2064: The terminal device B sends second detection packets based on the second detection parameter.

For example, the terminal device B continuously sends 128 second detection packets, destination IP addresses of the 128 second detection packets are all IP A, and a destination port of an $i^{th}$ first detection packet is PORT A+i×1.

After the terminal device A receives the second detection packets, the terminal device A may learn a public network IP address and a public network port that are for sending the second detection packets by the terminal device B. In this case, the terminal device A may send a second response packet to the terminal device B based on the public network IP address and the public network port that are for sending the second detection packets by the terminal device B, that is, S2065 is performed.

The second response packet may indicate that the sending terminal device A has received the second detection packets sent by the terminal device B.

When the terminal device B does not receive the second response packet within a second time period, the terminal device B fails to perform NAT traversal. In this case, the terminal device B may end NAT traversal.

The second time period is a second preset time period after the terminal device B sends all the second detection packets.

For example, the second preset time period may be preset.

After the terminal device B receives the second response packet, the terminal device B may learn a public network IP address and a public network port that are for sending the second response packet by the terminal device A, and the terminal device B may directly communicate with the terminal device A through the public network IP address and the public network port that are for sending the second response packet by the terminal device A, that is, the terminal device B successfully performs NAT traversal.

In some embodiments, after S2065, the terminal device B may further periodically send a second heartbeat packet to the terminal device A based on the public network IP address and the public network port that are for sending the second response packet by the terminal device A, that is, S2066 is performed. Correspondingly, the terminal device A receives the second heartbeat packet sent by the terminal device B.

In this case, if the terminal device A receives the second heartbeat packet sent by the terminal device B, it may be considered that the terminal device A successfully performs NAT traversal. If the terminal device A does not receive the second heartbeat packet sent by the terminal device B, it may be considered that the terminal device A fails to perform NAT traversal.

An execution sequence of S2064 and S2061 is not limited in embodiments of this application.

In this embodiment of this application, S2064 and S2061 may alternatively be simultaneously performed.

In some embodiments, if the terminal device A has received the second heartbeat packet before S2062, S2062 and S2063 may not be performed.

In some embodiments, if the terminal device B has received the first heartbeat packet before S2065, S2065 and S2066 may not be performed.

The following describes how to perform NAT traversal by using an example in which the terminal device A determines to use the policy B to perform NAT traversal and the terminal device B determines to use the policy B' to perform NAT traversal.

FIG. 6 is a schematic flowchart of an example in which the terminal device A uses the policy B to perform NAT traversal, and the terminal device B uses the policy B' to perform NAT traversal according to an embodiment of this application.

The terminal device A and the terminal device B may attempt a first round of NAT traversal.

For example, as shown in FIG. 6, a process of performing the first round of NAT traversal by the terminal device A and the terminal device B includes the following steps.

S2071: The terminal device A sends the first round of third detection packets based on the third detection parameter.

For example, the terminal device A continuously sends 64 third detection packets, destination IP addresses of the 64 third detection packets are all IP B, and a destination port of an $i^{th}$ third detection packet is PORT B+i×3.

After the terminal device B receives the third detection packets, the terminal device B may learn a public network IP address and a public network port that are for sending the third detection packets by the terminal device A. In this case, the terminal device B may send a third response packet to the terminal device A based on the public network IP address and the public network port that are for sending the third detection packets by the terminal device A, that is, S2072 is performed.

The third response packet may indicate that the sending terminal device B has received the third detection packets sent by the terminal device A.

When the terminal device A does not receive the third response packet within a third time period, the terminal device A fails to perform the first round of NAT traversal. In this case, the terminal device A may attempt a second round of NAT traversal.

The third time period is a third preset time period after the terminal device A sends the first round of all the third detection packets.

For example, the third preset time period may be preset.

After the terminal device A receives the third response packet, the terminal device A may learn a public network IP address and a public network port that are for sending the third response packet by the terminal device B, and the terminal device A may directly communicate with the terminal device B through the public network IP address and the public network port that are for sending the third response packet by the terminal device B, that is, the terminal device A successfully performs NAT traversal.

In some embodiments, after S2072, the terminal device A may further periodically send a third heartbeat packet to the terminal device B based on the public network IP address and the public network port that are for sending the third response packet by the terminal device B, that is, S2073 is performed. Correspondingly, the terminal device B receives the third heartbeat packet sent by the terminal device A.

After S2071, the terminal device A may notify, through the detection server, the terminal device B that the terminal device A has completed sending of the first round of the third detection packets. After the terminal device B receives a message indicating that the terminal device A has completed sending of the first round of the third detection packets, the terminal device B may start sending of a first round of fourth detection packets, that is, S2074 is performed.

S2074: The terminal device B sends the first round of the fourth detection packets based on the fourth detection parameter.

For example, the terminal device B continuously sends 64 fourth detection packets, destination IP addresses of the 64 fourth detection packets are all IP A, and a destination port of an $i^{th}$ fourth detection packet is PORT A+i×1.

After the terminal device A receives the fourth detection packets, the terminal device A may learn a public network IP address and a public network port that are for sending the fourth detection packets by the terminal device B. In this case, the terminal device A may send a fourth response packet to the terminal device B based on the public network IP address and the public network port that are for sending the fourth detection packets by the terminal device B, that is, S2075 is performed.

The fourth response packet may indicate that the sending terminal device A has received the fourth detection packets sent by the terminal device B.

When the terminal device B does not receive the fourth response packet within a fourth time period, the terminal device B fails to perform the first round of NAT traversal. In this case, the terminal device B may attempt a second round of NAT traversal.

The fourth time period is a fourth preset time period after the terminal device B sends the first round of all the fourth detection packets.

For example, the fourth preset time period may be preset.

After the terminal device B receives the fourth response packet, the terminal device B may learn a public network IP address and a public network port that are for sending the fourth response packet by the terminal device A, and the terminal device B may directly communicate with the terminal device A through the public network IP address and the public network port that are for sending the fourth response packet by the terminal device A, that is, the terminal device B successfully performs NAT traversal.

In some embodiments, after S2075, the terminal device B may further periodically send a fourth heartbeat packet to the terminal device A based on the public network IP address and the public network port that are for sending the fourth response packet by the terminal device A, that is, S2076 is performed. Correspondingly, the terminal device A receives the fourth heartbeat packet sent by the terminal device B.

In some embodiments, if the terminal device A has received the fourth heartbeat packet before S2072, S2072 and S2073 may not be performed. In addition, the terminal device A and the terminal device B do not need to perform a second round of NAT traversal.

In some embodiments, if the terminal device B has received the third heartbeat packet before S2075, S2075 and S2076 may not be performed. In addition, the terminal device A and the terminal device B do not need to perform a second round of NAT traversal.

The foregoing describes the first round of NAT traversal performed by the terminal device A and the first round of NAT traversal performed by the terminal device B, respectively. If the terminal device A and the terminal device B fail to perform the first round of NAT traversal, the terminal device A and the terminal device B further perform the second round of NAT traversal.

The following describes a process in which the terminal device A and the terminal device B perform the second round of NAT traversal.

As shown in FIG. 6, the process in which the terminal device A and the terminal device B perform the second round of NAT traversal includes the following steps.

S2071': The terminal device A sends a second round of third detection packets based on the third detection parameter.

For example, the terminal device A continuously sends 64 third detection packets, destination IP addresses of the 64 third detection packets are all IP B, and a destination port of an $i^{th}$ third detection packet is PORT B+i×2.

After the terminal device B receives the third detection packets, the terminal device B may learn a public network IP address and a public network port that are for sending the third detection packets by the terminal device A. In this case, the terminal device B may send a fifth response packet to the terminal device A based on the public network IP address and the public network port that are for sending the third detection packets by the terminal device A, that is, S2072' is performed.

The fifth response packet may indicate that the sending terminal device B has received the third detection packets sent by the terminal device A.

When the terminal device A does not receive the fifth response packet within a fifth time period, the terminal device A fails to perform the second round of NAT traversal. In this case, the terminal device A may end NAT traversal.

The fifth time period is a fifth preset time period after the terminal device A sends the second round of all the third detection packets.

For example, the fifth preset time period may be preset.

After the terminal device A receives the fifth response packet, the terminal device A may learn a public network IP address and a public network port that are for sending the fifth response packet by the terminal device B, and the terminal device A may directly communicate with the terminal device B through the public network IP address and the public network port that are for sending the fifth response packet by the terminal device B, that is, the terminal device A successfully performs NAT traversal.

In some embodiments, after S2072', the terminal device A may further periodically send a fifth heartbeat packet to the terminal device B based on the public network IP address and the public network port that are for sending the fifth response packet by the terminal device B, that is, S2073' is performed. Correspondingly, the terminal device B receives the fifth heartbeat packet sent by the terminal device A.

After S2071', the terminal device A may notify, through the detection server, the terminal device B that the terminal device A has completed sending of the second round of the third detection packets. After the terminal device B receives a message indicating that the terminal device A has completed sending of the second round of the third detection packets, the terminal device B may start sending of a second round of fourth detection packets, that is, S2074' is performed.

S2074': The terminal device B sends the second round of the fourth detection packets based on the fourth detection parameter.

For example, the terminal device B continuously sends 64 fourth detection packets, destination IP addresses of the 64 fourth detection packets are all IP A, and a destination port of an $i^{th}$ fourth detection packet is PORT A+i×1.

After the terminal device A receives the fourth detection packets, the terminal device A may learn a public network IP address and a public network port that are for sending the fourth detection packets by the terminal device B. In this case, the terminal device A may send a sixth response packet to the terminal device B based on the public network IP address and the public network port that are for sending the fourth detection packets by the terminal device B, that is, S2075' is performed.

The sixth response packet may indicate that the sending terminal device A has received the fourth detection packets sent by the terminal device B.

When the terminal device B does not receive the sixth response packet within a sixth time period, the terminal device B fails to perform NAT traversal. In this case, the terminal device B may end NAT traversal.

The sixth time period is a sixth preset time period after the terminal device B sends the second round of all the fourth detection packets.

For example, the sixth preset time period may be preset.

After the terminal device B receives the sixth response packet, the terminal device B may learn a public network IP address and a public network port that are for sending the sixth response packet by the terminal device A, and the terminal device B may directly communicate with the terminal device A through the public network IP address and the public network port that are for sending the sixth response packet by the terminal device A, that is, the terminal device B successfully performs NAT traversal.

In some embodiments, after S2075', the terminal device B may further periodically send a sixth heartbeat packet to the terminal device A based on the public network IP address and the public network port that are for sending the sixth response packet by the terminal device A, that is, S2076' is performed. Correspondingly, the terminal device A receives the sixth heartbeat packet sent by the terminal device B.

In some embodiments, if the terminal device A has received the sixth heartbeat packet before S2072', S2072' and S2073' may not be performed.

In some embodiments, if the terminal device B has received the fifth heartbeat packet before S2075', S2075' and S2076' may not be performed.

Time lengths of the first time period to the sixth time period are not limited in embodiments of this application.

NAT traversal is performed according to the determined NAT traversal policy provided in this embodiment of this application, so that the NAT traversal success rate can be improved.

An embodiment of this application further provides another method for determining a network address translation NAT traversal policy. The method is applied to a communication system including a first terminal device and a second terminal device. The first terminal device accesses a network by using a first NAT device, and the second terminal device accesses the network by using a second NAT device.

The following describes, with reference to FIG. 7 and FIG. 8, another method for determining a network address translation NAT traversal policy according to an embodiment of this application.

FIG. 7 is a schematic flowchart of a method 300 for determining a network address translation NAT traversal policy according to an embodiment of this application. As shown in FIG. 7, the method 300 includes the following steps.

S310: Obtain a first NAT message, where the first NAT message indicates a NAT type of a first terminal device and an Internet protocol IP address of the first terminal device in a network, and the NAT type includes symmetric NAT and cone NAT.

In some embodiments, the first NAT message further indicates a port of the first terminal device in the network.

S320: Obtain a second NAT message, where the second NAT message indicates a NAT type of a second terminal device and an IP address of the second terminal device in the network.

In some embodiments, the second NAT message further indicates a port of the second terminal device in the network.

S330: Determine, based on the first NAT message and the second NAT message, that both the NAT type of the first terminal device and the NAT type of the second terminal device are symmetric NAT.

S340: Determine, based on the first NAT message and the second NAT message, whether the IP address of the first terminal device in the network is the same as the IP address of the second terminal device in the network.

S350: In a case in which the IP address of the first terminal device in the network is different from the IP address of the second terminal device in the network, determine that the first terminal device adopts a first traversal policy to perform NAT traversal.

In some embodiments, before S350, the method 300 further includes S360.

S360: Obtain a first identity ID message and a second ID message, where the first ID message indicates an ID of the first terminal device, and the second ID message indicates an ID of the second terminal device.

In some embodiments, S350 may include: determining a parameter of the first traversal policy based on the first ID message and the second ID message.

It should be noted that, the determining a parameter of the first traversal policy may be understood as determining values of parameters included in the first traversal policy. For example, the parameter included in the first traversal policy may include a sending sequence of detection packets in each round, a quantity of sending rounds of detection packets, a sending quantity of the detection packets in each round, a destination port step of the detection packets in each round, initial values of destination ports of the detection packets in each round, and a value of a destination IP address of the detection packets in each round.

The destination port step of the detection packets in each round is a change value of a destination port of an $(i+1)^{th}$ detection packet in each round relative to a destination port of an $i^{th}$ detection packet in each round, where i is a positive integer.

The initial values of the destination ports of the detection packets in each round are the port that is of the second terminal device in the network and that is indicated by the second NAT message.

The destination IP address of the detection packets in each round is the IP address that is of the second terminal device in the network and that is indicated by the second NAT message.

For example, a total sending quantity of the detection packets is less than or equal to a maximum sending quantity of packets allowed by a firewall flow control mechanism corresponding to the first terminal device.

For example, it may be preset that: in a case in which a value of the ID of the first terminal device is greater than a value of the ID of the second terminal device, it is determined that the values of the parameters included in the first traversal policy form a first parameter set; or in a case in which a value of the ID of the first terminal device is less than a value of the ID of the second terminal device, it is determined that the values of the parameters included in the first traversal policy form a second parameter set.

It should be understood that, if in the values of the parameters included in the first traversal policy, at least one parameter has different values, it is considered that parameter sets formed by the values of the parameters included in the first traversal policy are different.

For example, elements in the parameter set may be arranged in a fixed sequence, for example, arranged based on the sending sequence of the detection packets in each round, the quantity of the sending rounds of the detection packets, the sending quantity of the detection packets in each round, the destination port step of the detection packets in each round, the initial values of the destination ports of the detection packets in each round, and the value of the destination IP address of the detection packets in each round.

For example, the parameter set may be {no sequence, 1, 128, 1, PORT 2, IP 2}. For another example, the parameter set may be {no sequence, 1, 128, 2, PORT 2, IP 2}.

For example, in the first traversal policy, the quantity of the sending rounds of the detection packets may be 1, the sending quantity of the detection packets in each round may be 128, and the destination port step of the detection packets in each round may be 1. In this case, the first terminal device may be considered as the terminal device A described above, the second terminal device may be considered as the terminal device B described above, and the first traversal policy may be considered as the policy A described above.

For example, in the first traversal policy, the quantity of the sending rounds of the detection packets may be 1, the sending quantity of the detection packets in each round may be 128, and the destination port step of the detection packets in each round is 2. In this case, the first terminal device may be considered as the terminal device B described above, the second terminal device may be considered as the terminal device A described above, and the first traversal policy may be considered as the policy A' described above.

For a part that is not described in the method 300, refer to related descriptions in the method 200. Details are not described herein again.

FIG. 8 is a schematic flowchart of a method 400 for determining a network address translation NAT traversal policy according to an embodiment of this application. As shown in FIG. 8, the method 400 includes the following steps.

S410: Obtain a first NAT message, where the first NAT message indicates a NAT type of a first terminal device and an Internet protocol IP address of the first terminal device in a network, and the NAT type includes symmetric NAT and cone NAT.

In some embodiments, the first NAT message further indicates a port of the first terminal device in the network.

S420: Obtain a second NAT message, where the second NAT message indicates a NAT type of a second terminal device and an IP address of the second terminal device in the network.

In some embodiments, the second NAT message further indicates a port of the second terminal device in the network.

S430: Determine, based on the first NAT message and the second NAT message, that both the NAT type of the first terminal device and the NAT type of the second terminal device are symmetric NAT.

S440: Determine, based on the first NAT message and the second NAT message, whether the IP address of the first terminal device in the network is the same as the IP address of the second terminal device in the network.

S450: In a case in which the IP address of the first terminal device in the network is the same as the IP address of the second terminal device in the network, determine that the first terminal device adopts a second traversal policy to perform NAT traversal.

In some embodiments, before S450, the method 400 further includes S460.

S460: Obtain a first identity ID message and a second ID message, where the first ID message indicates an ID of the first terminal device, and the second ID message indicates an ID of the second terminal device.

In some embodiments, S450 may include: determining a parameter of the second traversal policy based on the first ID message and the second ID message.

It should be noted that, the determining a parameter of the second traversal policy may be understood as determining values of parameters included in the second traversal policy. For example, the parameter included in the second traversal policy may include a quantity of sending rounds of detection packets, a sending sequence of detection packets in each round, a sending quantity of the detection packets in each round, a destination port step of the detection packets in each round, initial values of destination ports of the detection packets in each round, and a destination IP address of the detection packets in each round.

The sending sequence of the detection packets in each round is sending first or sending later.

The destination port step of the detection packets in each round is a change value of a destination port of an $(i+1)^{th}$ detection packet in each round relative to a destination port of an $i^{th}$ detection packet in each round, where i is a positive integer.

The initial values of the destination ports of the detection packets in each round are the port that is of the second terminal device in the network and that is indicated by the second NAT message.

The destination IP address of the detection packets in each round is the IP address that is of the second terminal device in the network and that is indicated by the second NAT message.

For example, a sending quantity of the detection packets is less than or equal to a maximum sending quantity of packets allowed by a firewall flow control mechanism corresponding to the first terminal device.

For example, it may be preset that: in a case in which a value of the ID of the first terminal device is greater than a value of the ID of the second terminal device, it is determined that the values of the parameters included in the second traversal policy form a third parameter set; or in a case in which a value of the ID of the first terminal device is less than a value of the ID of the second terminal device, it is determined that the values of the parameters included in the second traversal policy form a fourth parameter set.

It should be understood that, if in the values of the parameters included in the second traversal policy, at least one parameter has different values, it is considered that parameter sets formed by the values of the parameters included in the second traversal policy are different.

For example, elements in the parameter set may be arranged in a fixed sequence, for example, arranged based on the quantity of the sending rounds of the detection packets, the sending sequence of the detection packets in each round, the sending quantity of the detection packets in each round, the destination port step of the detection packets in each round, the initial values of the destination ports of the detection packets in each round, and a value of the destination IP address of the detection packets in each round.

For example, the parameter set may be {2, sending first, 1, 64, (3, 2), PORT 1, IP 1}. (3, 2) may be understood as that a destination port step of the detection packets in one round is 3, and a destination port step of the detection packets in another round is 2.

For another example, the parameter set may be {2, sending first, 1, 64, 1, PORT 1, IP 1}.

For example, in the second traversal policy, the quantity of the sending rounds of the detection packets may be 2 rounds, the sending quantity of the detection packets in each round may be 64 in each round, a destination port step of the detection packets in one round may be 3, and a destination port step of the detection packets in another round may be 2. In this case, the first terminal device may be considered as the terminal device A described above, the second terminal device may be considered as the terminal device B described above, and the second traversal policy may be considered as the policy B described above.

For example, in the second traversal policy, the quantity of the sending rounds of the detection packets may be 2, the sending quantity of the detection packets in each round may be 64, and the destination port step of the detection packets in each round may be 1. In this case, the first terminal device may be considered as the terminal device B described above, the second terminal device may be considered as the terminal device A described above, and the second traversal policy may be considered as the policy B' described above.

For a part that is not described in the method 400, refer to related descriptions in the method 200. Details are not described herein again.

An embodiment of this application further provides a NAT traversal method. In the method, detection packets are sent according to a first traversal policy. The first traversal policy includes a sending quantity of the detection packets and a destination port step of the detection packets, the sending quantity of the detection packets is 128, the destination port step of the detection packets is 1 or 2, and the destination port step of the detection packets is a change value of a destination port of an $(i+1)^{th}$ detection packet relative to a destination port of an $i^{th}$ detection packet, where i is a positive integer.

In a case in which the destination port step of the detection packets is 1, a first terminal device may be considered as the terminal device A described above, a second terminal device may be considered as the terminal device B described above, and the first traversal policy may be considered as the policy A described above.

In a case in which the destination port step of the detection packets is 2, the first terminal device may be considered as the terminal device B described above, the second terminal device may be considered as the terminal device A described above, and the first traversal policy may be considered as the policy A' described above.

For a part that is not described in the method, refer to related descriptions in the method 200. Details are not described herein again.

An embodiment of this application further provides a NAT traversal method. In the method, a first round of detection packets are sent according to a second traversal policy. The second traversal policy includes a quantity of sending rounds of detection packets, a sending quantity of detection packets in each round, and a destination port step of the detection packets in each round. The quantity of the sending rounds of the detection packets is 2; the sending quantity of the detection packets in each round is 64; and a destination port step of detection packets in one round is 3, and a destination port step of detection packets in another round is 2, or the destination port step of the detection packets in each round is 1.

In some embodiments, the second traversal policy further includes a sending sequence of the detection packets in each round. In a case in which the sending sequence of the detection packets in each round is sending first, the method further includes: if no response packet is received within a target time period, sending a second round of detection packets according to the second traversal policy, where the response packet indicates that the detection packets are received.

For example, in the second traversal policy, the quantity of the sending rounds of the detection packets may be 2, the sending sequence of the detection packets in each round may be sending first, the sending quantity of the detection packets in each round may be 64, a destination port step of the detection packets in one round may be 3, and a destination port step of the detection packets in another round may be 2. In this case, a first terminal device may be considered as the terminal device A described above, a second terminal device may be considered as the terminal device B described above, and the second traversal policy may be considered as the policy B described above.

In some other embodiments, the second traversal policy further includes the sending sequence of the detection packets in each round. In a case in which the sending sequence of the detection packets in each round is sending later, before the first round of the detection packets are sent according to the second traversal policy, the method further includes: receiving first indication information, where the first indication information indicates to send the first round of detection packets.

Optionally, the method further includes: receiving second indication information, where the second indication information indicates to send a second round of detection packets; and sending the second round of the detection packets according to the second traversal policy.

For example, in the second traversal policy, the quantity of the sending rounds of the detection packets may be 2, the sending sequence of the detection packets in each round may be sending later, the sending quantity of the detection packets in each round may be 64 and the destination port step of the detection packets in each round may be 1. In this case, the first terminal device may be considered as the terminal device B described above, the second terminal device may be considered as the terminal device A described above, and the first traversal policy may be considered as the policy B' described above.

For a part that is not described in the method, refer to related descriptions in the method 200. Details are not described herein again.

The foregoing describes in detail the method provided in this application with reference to FIG. 3 and FIG. 8. The following describes in detail embodiments of an apparatus in this application with reference to FIG. 9 to FIG. 11. It may be understood that, to implement the functions in the foregoing embodiments, an electronic device in FIG. 9 and FIG. 11 includes a corresponding hardware structure and/or software module for performing each function. A person skilled in the art should be easily aware that, in combination with the units and the method steps in the examples described in embodiments disclosed in this application, this application can be implemented by using hardware or a combination of hardware and computer software. Whether a function is performed by hardware or hardware driven by computer software depends on particular application scenarios and design constraint conditions of the technical solutions.

Figure 9:
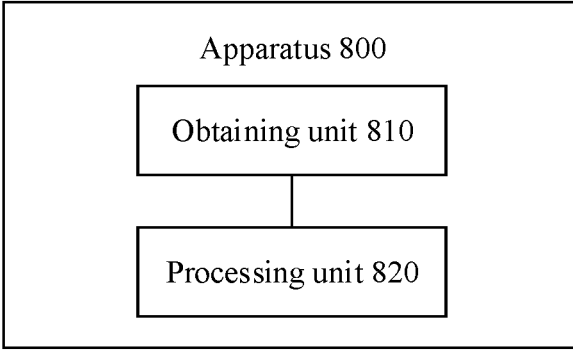
FIG. 9 is a schematic diagram of a structure of an apparatus for determining a NAT traversal policy according to an embodiment of this application.

FIG. 9 is a schematic diagram of a structure of an apparatus for determining a NAT traversal policy according to an embodiment of this application.

For example, as shown in FIG. 9, the apparatus 800 includes an obtaining unit 810 and a processing unit 820.

In an implementation, the obtaining unit 810 is configured to obtain a first NAT message, where the first NAT message indicates a NAT type of a first terminal device and an Internet protocol IP address of the first terminal device in a network, the NAT type includes symmetric NAT and cone NAT. The obtaining unit 810 is further configured to obtain a second NAT message, where the second NAT message indicates a NAT type of a second terminal device and an IP address of the second terminal device in the network. The processing unit 820 is configured to determine, based on the first NAT message and the second NAT message, that both the NAT type of the first terminal device and the NAT type of the second terminal device are symmetric NAT. The processing unit 820 is further configured to determine, based on the first NAT message and the second NAT message, whether the IP address of the first terminal device in the network is the same as the IP address of the second terminal device in the network. The processing unit 820 is further configured to determine, in a case in which the IP address of the first terminal device in the network is different from the IP address of the second terminal device in the network, that the first terminal device adopts a first traversal policy to perform NAT traversal.

In some embodiments, the obtaining unit 810 is further configured to obtain a first identity ID message and a second ID message, where the first ID message indicates an ID of the first terminal device, and the second ID message indicates an ID of the second terminal device. The processing unit 820 is configured to determine a parameter of the first traversal policy based on the first ID message and the second ID message.

In some embodiments, the first NAT message further indicates a port of the first terminal device in the network, and the second NAT message further indicates a port of the second terminal device in the network. The first traversal policy includes a sending sequence of detection packets in each round, a quantity of sending rounds of detection packets, a sending quantity of the detection packets in each round, a destination port step of the detection packets in each round, initial values of destination ports of the detection packets in each round, and a destination IP address of the detection packets in each round. The destination port step of the detection packets in each round is a change value of a destination port of an $(i+1)^{th}$ detection packet in each round relative to a destination port of an $i^{th}$ detection packet in each round, where i is a positive integer. The initial values of the destination ports of the detection packets in each round are the port that is of the second terminal device in the network and that is indicated by the second NAT message. The destination IP address of the detection packets in each round is the IP address that is of the second terminal device in the network and that is indicated by the second NAT message.

In some embodiments, a total sending quantity of the detection packets is less than or equal to a maximum sending quantity of packets allowed by a firewall flow control mechanism corresponding to the first terminal device; the quantity of the sending rounds of the detection packets is 1; the sending quantity of the detection packets in each round is 128; and/or the destination port step of the detection packets in each round is 1 or 2.

In another implementation, the obtaining unit 810 is configured to obtain a first NAT message, where the first NAT message indicates a NAT type of a first terminal device and an Internet protocol IP address of the first terminal device in a network, the NAT type includes symmetric NAT and cone NAT. The obtaining unit 810 is further configured to obtain a second NAT message, where the second NAT message indicates a NAT type of a second terminal device and an IP address of the second terminal device in the network. The processing unit 820 is configured to determine, based on the first NAT message and the second NAT message, that both the NAT type of the first terminal device and the NAT type of the second terminal device are symmetric NAT. The processing unit 820 is further configured to determine, based on the first NAT message and the second NAT message, whether the IP address of the first terminal device in the network is the same as the IP address of the second terminal device in the network. The processing unit 820 is further configured to determine, in a case in which the IP address of the first terminal device in the network is the same as the IP address of the second terminal device in the network, that the first terminal device adopts a second traversal policy to perform NAT traversal.

In some embodiments, the obtaining unit 810 is further configured to obtain a first identity ID message and a second ID message, where the first ID message indicates an ID of the first terminal device, and the second ID message indicates an ID of the second terminal device. The processing unit 820 is configured to determine a parameter of the second traversal policy based on the first ID message and the second ID message.

In some embodiments, the first NAT message further indicates a port of the first terminal device in the network, and the second NAT message further indicates a port of the second terminal device in the network. The second traversal policy includes a quantity of sending rounds of detection packets, a sending sequence of detection packets in each round, a sending quantity of the detection packets in each round, a destination port step of the detection packets in each round, initial values of destination ports of the detection packets in each round, and a destination IP address of the detection packets in each round. The sending sequence of the detection packets in each round is sending first or sending later. The destination port step of the detection packets in each round is a change value of a destination port of an $(i+1)^{th}$ detection packet in each round relative to a destination port of an $i^{th}$ detection packet in each round, where i is a positive integer. The initial values of the destination ports of the detection packets in each round are the port that is of the second terminal device in the network and that is indicated by the second NAT message. The destination IP address of the detection packets in each round is the IP address that is of the second terminal device in the network and that is indicated by the second NAT message.

In some embodiments, a sending quantity of the detection packets is less than or equal to a maximum sending quantity of packets allowed by a firewall flow control mechanism corresponding to the first terminal device; the quantity of the sending rounds of the detection packets is 2; the sending quantity of the detection packets in each round is 64; and/or a destination port step of detection packets in one round is 3, and a destination port step of detection packets in another round is 2, or the destination port step of the detection packets in each round is 1.

Figure 10:
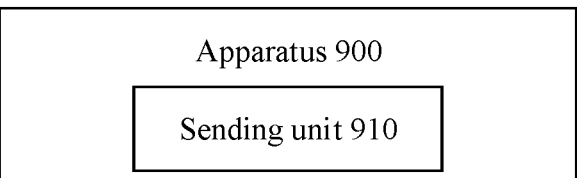
FIG. 10 is a schematic diagram of a structure of a NAT traversal apparatus according to an embodiment of this application.

FIG. 10 is a schematic diagram of a structure of a NAT traversal apparatus according to an embodiment of this application.

For example, as shown in FIG. 10, the apparatus 900 includes a sending unit 910.

In an implementation, the sending unit 910 is configured to send detection packets according to a first traversal policy, where the first traversal policy includes a sending quantity of the detection packets and a destination port step of the detection packets, the sending quantity of the detection packets is 128, the destination port step of the detection packets is 1 or 2, and the destination port step of the detection packets is a change value of a destination port of an $(i+1)^{th}$ detection packet relative to a destination port of an $i^{th}$ detection packet, where i is a positive integer.

In another implementation, the sending unit 910 is configured to send a first round of detection packets according to a second traversal policy, where the second traversal policy includes a quantity of sending rounds of detection packets, a sending quantity of detection packets in each round, and a destination port step of the detection packets in each round. The quantity of the sending rounds of the detection packets is 2; the sending quantity of the detection packets in each round is 64; and a destination port step of detection packets in one round is 3, and a destination port step of detection packets in another round is 2, or the destination port step of the detection packets in each round is 1.

In some embodiments, the second traversal policy further includes a sending sequence of the detection packets in each round. In a case in which the sending sequence of the detection packets in each round is sending first, the sending unit 910 is further configured to: if no response packet is received within a target time period, send a second round of detection packets according to the second traversal policy, where the response packet indicates that the detection packets are received.

In some embodiments, the second traversal policy further includes a sending sequence of the detection packets in each round. The apparatus further includes a receiving unit. The receiving unit is configured to: in a case in which the sending sequence of the detection packets in each round is sending later, before sending the first round of the detection packets according to the second traversal policy, receive first indication information, where the first indication information indicates to send the first round of the detection packets.

In some embodiments, the second traversal policy further includes a sending sequence of the detection packets in each round. The receiving unit is further configured to: in a case in which the sending sequence of the detection packets in each round is sending later, receive second indication information, where the second indication information indicates to send a second round of detection packets. The sending unit 910 is further configured to send the second round of the detection packets according to the second traversal policy.

Figure 11:
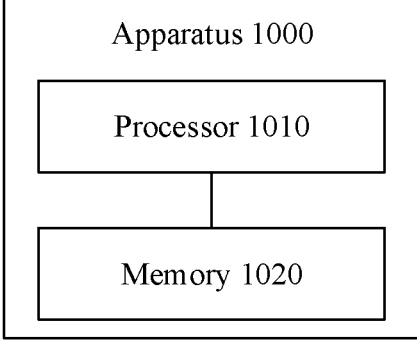
FIG. 11 is a schematic diagram of a structure of an apparatus according to an embodiment of this application.

FIG. 11 is a schematic diagram of a structure of another apparatus according to an embodiment of this application.

As shown in FIG. 11, the apparatus 1000 includes at least one processor 1010 and at least one memory 1020. The at least one memory 1020 is configured to store a program, and the at least one processor 1010 is configured to run the program to implement the method described above.

For example, the processor 1010 may be a general-purpose central processing unit (central processing unit, CPU), a microprocessor, an application-specific integrated circuit (application-specific integrated circuit, ASIC), a graphics processing unit (graphics processing unit, GPU), or one or more integrated circuits, and is configured to execute a related program, to implement a function that needs to be performed by a unit in any implementation of the terminal device provided in embodiments of this application, or perform steps of the foregoing method provided in embodiments of this application.

For example, the processor 1010 may alternatively be an integrated circuit chip, and has a signal processing capability. In an implementation process, the steps of the foregoing method provided in embodiments of this application can be implemented by using a hardware integrated logical circuit in a processor, or by using instructions in a form of software.

For example, the processor 1010 may alternatively be a general-purpose processor, a digital signal processor (digital signal processor, DSP), an application-specific integrated circuit (ASIC), an FPGA or another programmable logic device, a discrete gate or transistor logic device, or a discrete hardware component. The steps of the foregoing method provided in embodiments of this application may be implemented or performed. The general-purpose processor may be a microprocessor, or the processor may be any conventional processor or the like. The steps of the method provided with reference to embodiments of this application may be directly performed by a hardware decoding processor, or may be performed by using a combination of hardware and software modules in the decoding processor. The software module may be located in a mature storage medium in the art, like a random access memory, a flash memory, a read-only memory, a programmable read-only memory, an electrically erasable programmable memory, or a register. The storage medium is located in the memory. The processor reads information in the memory, and completes, in combination with hardware of the processor, a function that needs to be performed by a unit included in any implementation of the terminal device in embodiments of this application, or performs the steps of the foregoing method provided in embodiments of this application.

For example, the memory 1020 may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through an example rather than a limitative description, random access memories (random access memories, RAMs) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

An embodiment of this application further provides a communication system.

Figure 12:
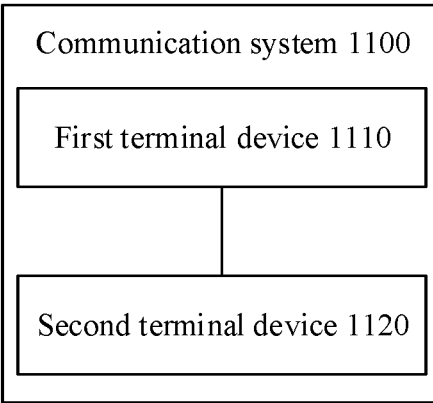
FIG. 12 is a schematic diagram of a structure of a communication system according to an embodiment of this application.

FIG. 12 is a schematic diagram of a structure of a communication system according to an embodiment of this application.

For example, as shown in FIG. 12, the communication system 1100 includes a first terminal device 1110 and a second terminal device 1120.

In some embodiments, the first terminal device 1110 may implement the steps in the method 300 or the method 400.

In some embodiments, the first terminal device 1110 may implement the steps performed by the terminal device A or the steps performed by the terminal device B in the method 200.

The descriptions of the procedures corresponding to the accompanying drawings have respective focuses. For a part that is not described in detail in a procedure, refer to related descriptions of another procedure.

An embodiment of this application further provides a computer-readable storage medium. The computer-readable storage medium has program instructions. When the program instructions are directly or indirectly executed, the foregoing method is implemented.

An embodiment of this application further provides a chip, including at least one processor and an interface circuit. The interface circuit is configured to provide program instructions or data for the at least one processor. The at least one processor is configured to execute the program instructions, to implement the foregoing method.

An embodiment of this application further provides a computer program product including instructions. When the computer program product runs on a computing device, the computing device is enabled to perform the foregoing method, or the computing device is enabled to implement a function of the foregoing apparatus.

All or some of the foregoing embodiments may be implemented by using software, hardware, firmware, or any combination thereof. When the software is used to implement embodiments, all or some of the foregoing embodiments may be implemented in a form of a computer program product. The computer program product includes one or more computer instructions or computer programs. When the program instructions or the computer programs are loaded or executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, like a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions to enable a computer device (which may be a personal computer, a server, a network device, or the like) to perform all or some of the steps of the methods described in embodiments of this application. The foregoing storage medium includes any medium that can store program code, like a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for determining a network address translation (NAT) traversal policy, wherein the method is applied to a communication system comprising a first terminal device and a second terminal device, the first terminal device accesses a network by using a first NAT device, the second terminal device accesses the network by using a second NAT device, and the method comprises:

obtaining a first NAT message, wherein the first NAT message indicates a NAT type of the first terminal device and an Internet protocol (IP) address of the first terminal device in the network;

obtaining a second NAT message, wherein the second NAT message indicates a NAT type of the second terminal device and an IP address of the second terminal device in the network;

determining, based on the first NAT message and the second NAT message, that both the NAT type of the first terminal device and the NAT type of the second terminal device are symmetric NAT;

determining, based on the first NAT message and the second NAT message, whether the IP address of the first terminal device in the network is the same as the IP address of the second terminal device in the network; and in a case in which the IP address of the first terminal device in the network is different from the IP address of the second terminal device in the network, determining that the first terminal device adopts a first traversal policy to perform NAT traversal;

wherein the first NAT message further indicates a port of the first terminal device in the network, the second NAT message further indicates a port of the second terminal device in the network, and the parameter of the first traversal policy comprises a sending sequence of detection packets in each round, a quantity of sending rounds of detection packets, a sending quantity of the detection packets in each round, a destination port step of the detection packets in each round, initial values of destination ports of the detection packets in each round, and a destination IP address of the detection packets in each round, wherein the destination port step of the detection packets in each round is a change value of a destination port of an $(i+1)^{th}$ detection packet in each round relative to a destination port of an $i^{th}$ detection packet in each round, wherein i is a positive integer;

the initial values of the destination ports of the detection packets in each round are the port that is of the second terminal device in the network and that is indicated by the second NAT message; and the destination IP address of the detection packets in each round is the IP address that is of the second terminal device in the network and that is indicated by the second NAT message.

2. The method according to claim 1, wherein the method further comprises:

obtaining a first identity (ID) message and a second ID message, wherein the first ID message indicates an ID of the first terminal device, and the second ID message indicates an ID of the second terminal device; and the determining that the first terminal device adopts the first traversal policy to perform NAT traversal comprises:

determining a parameter of the first traversal policy based on the first ID message and the second ID message.

3. The method according to claim 1, wherein a total sending quantity of the detection packets is less than or equal to a maximum sending quantity of packets allowed by a firewall flow control mechanism corresponding to the first terminal device;

the quantity of the sending rounds of the detection packets is 1;

wherein the sending quantity of the detection packets in each round is 128; and/or the destination port step of the detection packets in each round is 1 or 2.

4. A method for determining a network address translation (NAT) traversal policy, wherein the method is applied to a communication system comprising a first terminal device and a second terminal device, the first terminal device accesses a network by using a first NAT device, the second terminal device accesses the network by using a second NAT device, and the method comprises:

obtaining a first NAT message, wherein the first NAT message indicates a NAT type of the first terminal device and an Internet protocol IP address of the first terminal device in the network;

obtaining a second NAT message, wherein the second NAT message indicates a NAT type of the second terminal device and an IP address of the second terminal device in the network;

determining, based on the first NAT message and the second NAT message, that both the NAT type of the first terminal device and the NAT type of the second terminal device are symmetric NAT;

determining, based on the first NAT message and the second NAT message, whether the IP address of the first terminal device in the network is the same as the IP address of the second terminal device in the network; and in a case in which the IP address of the first terminal device in the network is the same as the IP address of the second terminal device in the network, determining that the first terminal device adopts a second traversal policy to perform NAT traversal;

wherein the first NAT message further indicates a port of the first terminal device in the network, the second NAT message further indicates a port of the second terminal device in the network, and the parameter of the second traversal policy comprises a quantity of sending rounds of detection packets, a sending sequence of detection packets in each round, a sending quantity of the detection packets in each round, a destination port step of the detection packets in each round, initial values of destination ports of the detection packets in each round, and a destination IP address of the detection packets in each round, wherein the sending sequence of the detection packets in each round is sending first or sending later;

the destination port step of the detection packets in each round is a change value of a destination port of an $(i+1)^{th}$ detection packet in each round relative to a destination port of an $i^{th}$ detection packet in each round, wherein i is a positive integer;

the initial values of the destination ports of the detection packets in each round are the port that is of the second terminal device in the network and that is indicated by the second NAT message; and the destination IP address of the detection packets in each round is the IP address that is of the second terminal device in the network and that is indicated by the second NAT message.

5. The method according to claim 4, wherein the method comprises:

obtaining a first identity (ID) message and a second ID message, wherein the first ID message indicates an ID of the first terminal device, and the second ID message indicates an ID of the second terminal device; and the determining that the first terminal device adopts the second traversal policy to perform NAT traversal comprises:

determining a parameter of the second traversal policy based on the first ID message and the second ID message.

6. The method according to claim 5, wherein a sending quantity of the detection packets is less than or equal to a maximum sending quantity of packets allowed by a firewall flow control mechanism corresponding to the first terminal device;

the quantity of the sending rounds of the detection packets is 2;

wherein the sending quantity of the detection packets in each round is 64; and/or a destination port step of detection packets in one round is 3, and a destination port step of detection packets in another round is 2; or the destination port step of the detection packets in each round is 1.

7. A communication apparatus, wherein the communication apparatus comprises a processor and a memory, the memory is configured to store computer-readable instructions, and the processor is configured to execute the computer-readable instructions to implement:

obtaining a first network address translation (NAT) message, wherein the first NAT message indicates a NAT type of a first terminal device and an Internet protocol IP address of the first terminal device in the network;

obtaining a second NAT message, wherein the second NAT message indicates a NAT type of a second terminal device and an IP address of the second terminal device in the network;

determining, based on the first NAT message and the second NAT message, that both the NAT type of the first terminal device and the NAT type of the second terminal device are symmetric NAT;

determining, based on the first NAT message and the second NAT message, whether the IP address of the first terminal device in the network is the same as the IP address of the second terminal device in the network; and in a case in which the IP address of the first terminal device in the network is different from the IP address of the second terminal device in the network, determining that the first terminal device adopts a first traversal policy to perform NAT traversal;

wherein the first NAT message further indicates a port of the first terminal device in the network, the second NAT message further indicates a port of the second terminal device in the network, and the parameter of the first traversal policy comprises a sending sequence of detection packets in each round, a quantity of sending rounds of detection packets, a sending quantity of the detection packets in each round, a destination port step of the detection packets in each round, initial values of destination ports of the detection packets in each round, and a destination IP address of the detection packets in each round, wherein the destination port step of the detection packets in each round is a change value of a destination port of an $(i+1)^{th}$ detection packet in each round relative to a destination port of an $i^{th}$ detection packet in each round, wherein i is a positive integer;

the initial values of the destination ports of the detection packets in each round are the port that is of the second terminal device in the network and that is indicated by the second NAT message; and the destination IP address of the detection packets in each round is the IP address that is of the second terminal device in the network and that is indicated by the second NAT message.

8. The communication apparatus according to claim 7, wherein the processor is configured to execute the computer-readable instructions to implement:

obtaining a first identity (ID) message and a second ID message, wherein the first ID message indicates an ID of the first terminal device, and the second ID message indicates an ID of the second terminal device; and the determining that the first terminal device adopts the first traversal policy to perform NAT traversal comprises:

determining a parameter of the first traversal policy based on the first ID message and the second ID message.

9. The communication apparatus according to claim 7, wherein a total sending quantity of the detection packets is less than or equal to a maximum sending quantity of packets allowed by a firewall flow control mechanism corresponding to the first terminal device;

the quantity of the sending rounds of the detection packets is 1;

wherein the sending quantity of the detection packets in each round is 128; and/or the destination port step of the detection packets in each round is 1 or 2.

* * * * *